(12) United States Patent
Lin et al.

(10) Patent No.: US 8,736,600 B2
(45) Date of Patent: May 27, 2014

(54) SYSTEMS AND METHODS FOR IMAGING A THREE-DIMENSIONAL VOLUME OF GEOMETRICALLY IRREGULAR GRID DATA REPRESENTING A GRID VOLUME

(75) Inventors: Jim Ching-Rong Lin, Sugar Land, TX (US); Chi-Kang David Chien, Sugar Land, TX (US); Jeffrey M. Yarus, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 405 days.

(21) Appl. No.: 12/479,469

(22) Filed: Jun. 5, 2009

(65) Prior Publication Data

US 2009/0303233 A1  Dec. 10, 2009

Related U.S. Application Data

(60) Provisional application No. 61/059,716, filed on Jun. 6, 2008.

(51) Int. Cl.
*G06T 15/00*  (2011.01)

(52) U.S. Cl.
USPC ........... 345/419; 345/418; 345/420; 345/423; 345/424; 345/429; 345/430; 345/441; 345/442; 345/433; 382/128; 382/154; 382/171; 382/280; 382/111

(58) Field of Classification Search
USPC ......... 345/418, 419, 420, 423, 424, 429, 430, 345/441, 442, 433; 382/128, 154, 171, 280, 382/111
See application file for complete search history.

(56) References Cited

U.S. PATENT DOCUMENTS

| | | | |
|---|---|---|---|
| 4,359,766 A | | 11/1982 | Waters et al. |
| 4,467,461 A | | 8/1984 | Rice |
| 5,056,066 A | | 10/1991 | Howard |
| 5,148,494 A | | 9/1992 | Keskes |
| 5,432,751 A | | 7/1995 | Hildebrand |
| 5,458,111 A | | 10/1995 | Coin |
| 5,555,352 A | * | 9/1996 | Lucas ........................ 345/423 |
| 5,570,460 A | * | 10/1996 | Ramanujam ................. 345/424 |
| 5,630,034 A | | 5/1997 | Oikawa et al. |
| 5,734,384 A | | 3/1998 | Yanof et al. |
| 5,781,194 A | | 7/1998 | Ponomarev et al. |

(Continued)

FOREIGN PATENT DOCUMENTS

| | | |
|---|---|---|
| EP | 0228231 A | 7/1987 |
| JP | 6-236440 A | 8/1994 |

(Continued)

OTHER PUBLICATIONS

The International Search Report and the Written Opinion of the International Searching Authority PCT/US2009/46383; Aug. 18, 2009; 8 pages; European Patent Office.

(Continued)

*Primary Examiner* — Abderrahim Merouan
(74) *Attorney, Agent, or Firm* — Crain, Caton & James; Bradley A. Misley

(57) ABSTRACT

Systems and methods for imaging a 3D volume of geometrically irregular grid data. The systems and methods utilize various types of probes and displays to render the geometrically irregular grid data, in real-time, and analyze the geometrically irregular grid data.

14 Claims, 23 Drawing Sheets
(13 of 23 Drawing Sheet(s) Filed in Color)

(56) References Cited

U.S. PATENT DOCUMENTS

| | | | |
|---|---|---|---|
| 5,838,564 A | 11/1998 | Bahorich et al. | |
| 5,839,440 A | 11/1998 | Liou et al. | |
| 5,877,768 A | 3/1999 | Jain | |
| 5,892,732 A | 4/1999 | Gereztenkom | |
| 5,949,424 A | 9/1999 | Cabral et al. | |
| 5,956,041 A * | 9/1999 | Koyamada et al. | 345/420 |
| 5,970,499 A | 10/1999 | Smith et al. | |
| 5,995,108 A | 11/1999 | Isobe et al. | |
| 6,008,813 A * | 12/1999 | Lauer et al. | 345/424 |
| 6,018,347 A * | 1/2000 | Willis | 345/419 |
| 6,049,759 A | 4/2000 | Etgen | |
| 6,064,771 A | 5/2000 | Migdel et al. | |
| 6,075,538 A * | 6/2000 | Shu et al. | 345/419 |
| 6,078,869 A | 6/2000 | Gunasekera | |
| 6,106,561 A | 8/2000 | Farmer | |
| 6,191,787 B1 | 2/2001 | Lu et al. | |
| 6,266,453 B1 | 7/2001 | Hibbard et al. | |
| 6,369,830 B1 | 4/2002 | Brunner et al. | |
| 6,396,495 B1 | 5/2002 | Parghi et al. | |
| 6,424,464 B1 | 7/2002 | Neff et al. | |
| 6,473,696 B1 | 10/2002 | Onyla | |
| 6,584,235 B1 | 6/2003 | Fossum et al. | |
| 6,584,339 B2 | 6/2003 | Galloway et al. | |
| 6,594,585 B1 | 7/2003 | Gereztenkom | |
| RE38,229 E | 8/2003 | Marfurt et al. | |
| 6,664,961 B2 | 12/2003 | Ray et al. | |
| 6,674,430 B1 | 1/2004 | Kaufman et al. | |
| 6,690,371 B1 | 2/2004 | Okerlund et al. | |
| 6,690,820 B2 | 2/2004 | Lees et al. | |
| 6,765,570 B1 | 7/2004 | Cheung et al. | |
| 6,766,255 B2 * | 7/2004 | Stone | 702/13 |
| 6,940,507 B2 | 9/2005 | Repin et al. | |
| 6,987,878 B2 | 1/2006 | Lees et al. | |
| 7,006,085 B1 | 2/2006 | Acosta et al. | |
| 7,013,218 B2 | 3/2006 | Baker, III et al. | |
| 7,024,021 B2 * | 4/2006 | Dunn et al. | 382/109 |
| 7,076,735 B2 | 7/2006 | Callegari | |
| 7,098,908 B2 | 8/2006 | Acosta | |
| 7,102,647 B2 | 9/2006 | Sloan et al. | |
| 7,123,258 B2 * | 10/2006 | Deny et al. | 345/423 |
| 7,170,530 B2 | 1/2007 | Cui et al. | |
| 7,218,331 B2 | 5/2007 | Huang et al. | |
| 7,248,258 B2 | 7/2007 | Acosta | |
| 7,281,213 B2 | 10/2007 | Callegari | |
| 7,298,376 B2 | 11/2007 | Chuter | |
| 7,412,363 B2 | 8/2008 | Callegari | |
| 8,400,447 B1 * | 3/2013 | Carr et al. | 345/419 |
| 2002/0109684 A1 | 8/2002 | Repin et al. | |
| 2002/0113785 A1* | 8/2002 | Hill | 345/420 |
| 2002/0165689 A1 | 11/2002 | Callegari | |
| 2002/0172401 A1 | 11/2002 | Lees et al. | |
| 2003/0000535 A1 | 1/2003 | Galloway et al. | |
| 2003/0001836 A1* | 1/2003 | Ernst et al. | 345/419 |
| 2003/0001859 A1 | 1/2003 | Sloan et al. | |
| 2003/0025692 A1 | 2/2003 | Lu et al. | |
| 2003/0109296 A1* | 6/2003 | Leach et al. | 463/6 |
| 2004/0019274 A1 | 1/2004 | Galloway et al. | |
| 2004/0021662 A1 | 2/2004 | Taubin | |
| 2004/0081353 A1 | 4/2004 | Lees et al. | |
| 2004/0174357 A1 | 9/2004 | Cheung | |
| 2004/0223003 A1 | 11/2004 | Heirich et al. | |
| 2004/0227772 A1 | 11/2004 | Huang | |
| 2005/0021656 A1 | 1/2005 | Callegari | |
| 2005/0043619 A1* | 2/2005 | Sumanaweera et al. | 600/437 |
| 2005/0114831 A1 | 5/2005 | Callegari et al. | |
| 2005/0168461 A1 | 8/2005 | Acosta | |
| 2005/0231503 A1 | 10/2005 | Heng et al. | |
| 2005/0237334 A1 | 10/2005 | Chuter | |
| 2006/0052690 A1 | 3/2006 | Sirohey et al. | |
| 2006/0206562 A1 | 9/2006 | Callegari | |
| 2006/0279569 A1 | 12/2006 | Acosta | |
| 2006/0290695 A1* | 12/2006 | Salomie | 345/420 |
| 2006/0290715 A1 | 12/2006 | Cui et al. | |
| 2007/0010743 A1 | 1/2007 | Arai | |
| 2007/0057938 A1* | 3/2007 | Usami et al. | 345/419 |
| 2007/0150244 A1* | 6/2007 | Senecal et al. | 703/9 |
| 2008/0024512 A1 | 1/2008 | Chuter | |
| 2008/0243454 A1* | 10/2008 | Mallet | 703/6 |

FOREIGN PATENT DOCUMENTS

| | | |
|---|---|---|
| JP | 7-57118 A | 3/1995 |
| WO | WO/02/29445 A1 | 4/2002 |
| WO | WO/00/14574 A1 | 3/2003 |
| WO | WO2004098414 | 11/2004 |
| WO | WO/2005/013254 A1 | 2/2005 |

OTHER PUBLICATIONS

Article 34 Response, PCT/US2009/46383, Aug. 26, 2009, 5 pages.

Elvins T.T., "A Survey of Algorithms for Volume Visualization" Computer Graphics, ACM, US, vol. 26, No. 3, Aug. 1, 1992, pp. 194-201.

Crawfis R.A. et al., A Scientific Visualization Synthesizer, Visualization 1991 Proceedings, IEEE Conference on San Diego CA, USA, Oct. 22, 1992, pp. 262-267.

Taner, M. Turhan, Seismic Attributes, CSG Recorder [online] Sep. 2001 [retrieved on Nov. 23, 2009] Retrieved from <http://www.cseg.ca/publications/recorder/2001/09sep/sep01-seismic-attributes.pdf>.

Taylor, R., Visualizing Multiple Fields on the Same Surface, IEEE Computer Graphics and Applications [online] vol. 22, No. 3, Jun. 2002 [retrieved on Nov. 23, 2009] Retrieved from <http://doi.ieeecomputersociety.org/10.1109/MCG.2002.10014> pp. 6-10.

Supplementary European Search Report, EP 04 75 7319, European Patent Office, Nov. 24, 2009, 6 pages.

Rost, Randi J., Kessinich, John M. and Lichtenbelt, Barthold ; 2.1 Introduction to the OpenGL Shading Language, 2.2 Why Write Shaders?, 2.3 OpenGL Programmable Processors; OpenGL Shading Language; 2004; pp. 33-36; Chapter 2; Addison-Wesley.

Foley, James D., Van Dam, Andries, Feiner, Steven K. and Hughes, John F.; Image Manipulation and Storage; Computer Graphics: Principles and Practice; 1990; p. 838; Second Edition; Addison Wesley Publishing Company.

James, Huw, Peloso, Andy and Wang, Joanne; Volume Interpretation of Multi-Attribute 3D Surveys; First Break; Mar. 2002; pp. 176-179; vol. 20.3; EAGE.

Dopkin, Duane and James, Huw; Trends in Visualization for E&P Operations; First Break; Mar. 2006; pp. 55-59; vol. 24; EAGE.

Christie, Murray; Thinking Inside the Box; CSEG Recorder; Jun. 2002; pp. 50-57.

Lin, Jim Ching-Rong; Geoscience Visualization with GPU Programming; SPEI Visualization and Data Analysis; 2005; pp. 126-134; Houston, Texas.

Mark, William R., Glanville, R. Steven; Akeley; Kurt and Kilgard, Mark J.; Cg: A System for Programming Graphics Hardware in a C-like Language; Siggraph 2003; pp. 896-907.

Manssour, Isabel H., Furuie, Sergio S., Olabarriaga, Silvia D. and Freitas, Carla M.D.S.; Visualizing Inner Structures in Multimodel Volume Data; XV Brazilian Symposium on Computer Graphics and Image Processing (SIBGRAPI'02); 2002; pp. 51-59.

Cai, Wenli and Sakas, Georgios; Data Intermixing and Multi-Volume Rendering; Eurographics '99; Sep. 7, 1999; pp. 359-368; vol. 18, No. 3; Blackwell Publishers; Oxford, UK and Malden, MA.

Neider, Jackie, Davis, Tom and Woo, Mason; OpenGL Programming Guide; 1994; pp. 422-427; 3rd Edition; Multitexturing; Silicon Graphics, Inc.; Addison-Wesley Professional.

Castanie, Laurent, Levy, Bruno and Bosquet, Fabian; VolumeExplorer: Roaming Large Volumes to Couple Visualization and Data Processing for Oil and Gas Exploration; Oct. 23-28, 2005; pp. 247-254; Proceedings of the IEEE Visualization; Minneapolis, MN.

Fernando, Randima and Kilgard, Mark J.; Cg Toolkit—User's Manual; A Developer's Guide to Programmable Graphics; Sep. 2005; 356 pages; Release 1.4; NVIDIA; Addison-Wesley; Santa Clara, CA.

Brown, Alistair R., Interpretation of Three-Dimensional Seismic Data; AAPG Memoir 42; Dec. 1999; pp. 19, 233; Fifth Edition; American Association of Petroleum Geologists.

(56) References Cited

OTHER PUBLICATIONS

Robler, Friedemann, Tejada, Eduardo, Fangmeier, Thomas, Ertl, Thomas and Knauff, Markus; GPU-based Multi-Volume Rendering for the Visualization of Function Brain Images; 2006; 14 pages.

Lum, Eric B., Wilson, Brett and MA, Kwan Liu; High-Quality Lighting and Efficient Pre-Integration for Volume Rendering; Joint Eurographics—IEEE TCVG Symposium on Visualization/The Eurographics Association; 2004; 11 pages.

Castanie, Laurent, Bosquet, Fabien and Levy, Bruno; Advances in Seismic Interpretation Using New Volume Visualization Techniques; First Break (Special Topic—Reservoir Geoscience/Engineering); Oct. 2005; pp. 69-72; vol. 23; EAGE.

Mark J. Kilgard; A Practical and Robust Bump-mapping Technique for Today's GPUs; GDC 2000: Advanced OpenGL Game Development; Jul. 5, 2000; pp. 1-39; NVIDIA Corporation; Santa Clara, California.

Lees Jack A.; Constructing Faults From Seed Picks by Voxel Tracking; The Leading Edge; Mar. 1999; pp. 338-340; Texaco Visualization Geophysical Team; Houston, Texas.

Texaco E&P Center Allows Visual Probe of 3D Data Volumes, Oil & Gas Journal, Jun. 1, 1998, pp. 46-47, copied as one page.

IRIS Universe No. 36, Silicon Graphics Inc., Summer 1996, 96 pages.

"Computing", Mechanical Engineering Magazine, Oct. 1996, The American Society of Mechanical Engineers, 8 Pgs.

"VoxelGeo Consortium Meeting Summary," CogniSeis Development, Jun. 13, 1996, 2 pages.

Ching-Rong Lin, R. Bowen Loftin, and H. Roice Nelson, Jr., Interaction with Geoscience Data in an Immersive Environment, Virtual Reality, 2000, pp. 55-62.

Ching-Rong Lin and R. Bowen Loftin, Application of Virtual Reality in the Interpretation of Geoscience Data, Proceedings of the ACM Symposium on Virtual Reality Software and Technology, 1998, 8 pages.

VoxelGeo, Paradigm Geophysical Broadband Solutions in Depth, Mar. 27, 1998, 5 pages, printed from Cogniseis website www.cogniseis.com/voxelgeo.htm.

Bajaj, et al., "Fast Isocontouring for Improved Interactivity", Proc. ACM SIGGRAPH/IEEE Symposium on Volume Visualization (ACM Press, 1996), 12 Pgs.

Lacroute, "Fast Volume Rendering Using a Shear-Warp Factorization of the Viewing Transformation", Doctoral dissertation submitted to Departments of Electrical Engineering and Computer Science Stanford University, Sep. 1995, 236 pages, Stanford University Stanford, CA, USA.

Ney, Fishman, "Editing Tools for 3D Medical Imaging," IEEE Computer Graphics & Applications, Nov. 1991, pp. 63-71, vol. 11 issue 6, IEEE Computer Society Press, Los Alamitos, CA, U.S.A.

Holden, Paul, VoxelGeo 1.1.1: Productivity Tool for the Geosciences, Release Notes (1994) & User's Guide (Rev. Mar. 1994), Vital Images, Inc., pp. 1-461.

"Does Your 3D Interpretation Software Move as Fast as You Do? Geoprobe Does." Sep. 1999, Brochure, published by Magic Earth, 2 pages, US.

Levin, Stewart A.; Resolution in Seismic Imaging: Is it all a Matter of Perspective?; Geophysics 63(2); Mar.-Apr. 1998; pp. 743-749; vol. 63, No. 2; USA.

Sheriff, R.E.; Encyclopedic Dictionary of Applied Geophysics; http://scitation.aip.org/journals/doc/SEGLIB-home/segLogin.jsp; 2002; 1 page; 4th Ed.; Society of Exploration Geophysicists; Tulsa, Oklahoma.

Tanner, M. Turhan, Ernest E. and Neidell, Norman S.; Paleo Seismic and Color Acoustic Impedence Sections; Applications of Downward Continuation in Structural and Stratigraphic Context; 1982; pp. 110-111; Expanded Abstract S8.7, 52nd Annual Meeting of The Society of Exploration Geophysicists; Dallas, Texas.

Yilmaz, Oz, and Lucas, Darran; Prestack Layer Replacement; Geophysics 51(7); Jul. 1986; pp. 1355-1369; vol. 51, No. 7; USA.

Foley, James D., Van Dam, Adries, Feiner, Steven K. and Hughes, John, "Image Manipulation and Storage; Computer Graphics; Principles and Practice" 1990; p. 838; Second Edition; Addison Wesley.

Lin, Ching-Rong, Loftin, R. Bowen & Stark, Tracy: Virtual Reality for Geosciences Visualization: Computer Human Interaction; 1998; Proceedings, 3rd Asia Pacific Shonan Village Center; Japan; Jul. 15-17, 1998; pp. 196-201; IEEE Comput. Soc. US, Las Alamitos, CA.

Pommert, Andreas, Hohne, Karl Heinz, Pflesser, Bernhard, Riemer, Martin, Schiemann, Thomas, Schubert, Rainer, Tiede, Ulf & Schumacher, Udo; A Highly Realistic Volume Model Derived From the Visible Human Male; The Third Visible Human Project Conference, Bethesda, Maryland; Oct. 2000; 11 pages.

Oldenzeil, T.; Dithuijzen, Roos Van & Kruijsdijk, Cor Van; Geologic Parameterization of Reservoir Model Enhances History-Match Procedure; The Leading Edge; Jun. 2002; pp. 544-551; vol. 21, No. 6.

Schwab, Matthias; Enhancement of Discontinuities in Seismic 3-D Images Using a Java Estimation Library; Ph.D Thesis/Stanford University/Department of Geophysics, Jun. 2001; 164 Pages.

Cortesi, "REACT Real Time Programmer's Guide", Mar. 18, 1997, 187 pages, Silicon Graphics Inc., California, U.S.A.

Durkin, Hughes, "Nonpolygonal Isosurface Rendering for Large Volume Datasets", "Proceedings of the conference on Visualization '94", 1994, p. 293-300, IEEE Computer Society Press, Los Alamitos, CA, U.S.A.

Lorensen, Cline, "Marching Cubes: A High Resolution 3D Surface Construction Algorithm," Computer Graphics, vol. 21 issue 4, Jul. 1987, pp. 163-169, Association for Computing Machinery, New York, U.S.A.

Cabral, et al., "Accelerated Volume Rendering and Tomographic Reconstruction Using Texture Mapping Hardware", 1995, p. 91-97, Association for Computing Machinery, New York, U.S.A.

Cullip, Timothy and Neumann, Ulrich, "Accelerating Volume Reconstruction with 3D Texture Hardware", 1993, 6 pgs; University of North Carolina, Chapel Hill, U.S.A.

Cignoni, Montani, Scopigno, "MagicSphere: an insight tool for 3D data visualization," 1994, p. 317-328, vol. 13(3), Computer Graphics Forum,The Eurographics Association and Blackwell Publishing Ltd. Oxford, U.K.

Yagel Roni, "The Flipping Cube: A Device for Rotating 3D Rasters", "Advances in Computer Graphics Hardware (Machines)", 1991, p. 86-99.

Höllerer, Hege, Stallings, "Visualization and 3D-Interaction for Hyperthermia Treatment Planning," 1995, 7 pages; Proceedings, 9th International Symposium on Computer Assisted Radiology, CH Volume Visualization Workshop, Berlin, Germany.

Levoy Marc, "Design for a Real-Time High-Quality Volume Rendering Workstation", Proceedings of the Chapel Hill Workshop on Volume Visualization, 1989, pp. 85-92, Association for Computing Machinery, New York, U.S.A.

Kanus, et al, "Implimentations of Cube-4 on the Teramac Custom Computing Machine", "Computers and Graphics", 1997, pp. 199-208, vol. 21, Elsevier, London, U.K.

Kaufman, Bakalash "Memory and Processing Architecture for 3D Voxel-Based Imagery," "IEEE Computer Graphics and Applications", Nov.-Dec. 1988, pp. 10-23, vol. 08 No. 6, IEEE Computer Society, Washington D.C., U.S.A.

Brady, et al, "Crumbs: a virtual environment tracking tool for biological imaging," IEEE Symposium on Frontiers in Biomedical Visualization, 1995, pp. 18-25, 82, IEEE Computer Society, Washington DC, U.S.A.

Fraser Robert, "Interactive Volume Rendering Using Advanced Gaphics Architectures," 1994, 8 pages, Silicon Graphics Inc.

Kulic, "Building an OpenGL Volume Renderer" "SGI Development News", 1996, 9 pages.

Serra, et al., "Interactive Vessel Tracing in Volume DATA", 1997, pp. 131-137 "Symposium on 3D Graphics", Providence, RI.

Pfister, Kaufman, "Cube 4—A Scalable Architecture for Real-Time Volume Rendering," Proceedings 1996 IEEE Symposium on Volume Visualization, Oct. 28-29, 1996, pp. 47-54, 100.

Speray, Kennon, "Volume Probes: Interactive data Exploration on Arbitrary Grids" Computer Graphics, vol. 24 issue 5, Nov. 1990, pp. 5-12, Association for Computing Machinery, New York, U.S.A.

(56) References Cited

OTHER PUBLICATIONS

The International Search Report and the Written Opinion of the International Searching Authority PCT/US2008/050256, Sep. 15, 2008, 14 pages, European Patent Office.
Ferre, Maria, Puig, Anna & Tost, Dani; A Framework for Fusion Methods and Rendering Techniques of Multimodal Volume Data, Computer Animation and Virtual Worlds, 2004, pp. 63-77.
Krilger, J. and Westermann, R.; Acceleration Techniques for GPU-based Volume Rendering; IEEE Visualization, Oct. 19-24, 2003, pp. 287-292, Seattle, Washington.
Yagel et al.; Hardware Assisted Volume Rendering of Unstructured Grids by Incremental Slicing, 1996, pp. 1-11.
Petrel Seismic to Simulation Software, Schlumberger, [online] [retrieved on Jan. 13, 2010], <retrieved from http://www.slb.com/content/services/software/geo/petrel/index.asp?>, 1 page.
Lin, J., Chien, D., Yarus, J.; GridProbe: A System for Interactively Visualizing Large Petroleum Reservoirs, 2008, 8 pages.
VIP Software, 3DView User Guide, Data Visualization Techniques, pp. 75-140, Mar. 2001.
Masahiro Fujita et al. "Applying Per-Pixel Shading for Relief Texture Mapping", Report of Research of Information Processing Society of Japan, vol. 2002, No. 1 09, Nov. 22, 2002, 1 page. [Abstract Only].
Ukla Chauhan, International Preliminary Report on Patentability—PCT/US2009/046383, Nov. 15, 2010, 7 pages, United States Patent and Trademark Office as Examining Authority, Alexandria, Virginia USA.
Cogniseis, "VoxelGeo version 2.2 Product Definition version 14", May 1996, Houston, Texas, 27 pages.
Landmark Graphics Corporation, Operational manual on "Seiscube," Oct. 1996, pp. 1-272.
Landmark Graphics Corporation, Operational manual on "OpenVision," Jul. 1997, pp. 1-169.
Landmark Graphics, User Documentation, Faults (Displaying Faults and Using Seismic Planes with Animation and Frame Control), EarthCube, 2002, pp. 11-15, 53-55.
Landmark Graphics, User Documentation, Seismic (Overview & Seismic Display and Navigation), EarthCube, 2002, pp. 1, 65-115.
Landmark Graphics, User Documentation, Setup (Faults & Selecting an Object), EarthCube, 2002, pp. 13-20, 93-9.
VoxelGeo User's Manual 2.1.5, Oct. 1996, 213 Pages, Cogniseis Development, Inc., Houston, Texas.
Openworks Sections; 2004; 12 pages.
Mexican Institute of Industrial Property, Non-final Office Action-MX/a/2010/012490, Nov. 2011, 4 pages, Mexican Institute of Industrial Property, Mexico.
Uhthoffgomez Vega & Uhthoff; Response to Non-Final Office Action- MX/A/2010/012490; Mar. 2, 2012; 5 pages, Uhthoffgomez Vega & Uhthoff; Mexico.
Nguyen, Phu; Non-Final Office Action; U.S. Appl. No. 10/806,980; May 12, 2011; United States Patent Office, Alexandria, Virginia; 12 pages.
Ghosh, Abhijeet et al.; "Hardware Assisted Multichannel Volume Rendering"; Proceedings Computer Graphics International 2003; Jul. 9-11, 2003; pp. 2-7.
Dachille IX, Frank et al.; "GI-Cube: An Architecture for Volumetric Global Illumination and Rendering"; Proceedings of the ACM Siggraph/Eurographics Workshop on Graphics Hardware (HWWS '00); Stephan N. Spencer (Ed.); Aug. 21-22, 2000; ACM, New York, New York; pp. 119-128.
Hong, H. et al.; "Intermixed Visualization of Atonomical Structure and Ventricular Shape in Cardiology"; 2000 IEEE Nuclear Science Conference Record; vol. 3; Oct. 15-20, 2000; pp. 18/87-18/91.

Sturm, B. et al.; "Image Fusion of 4D Cardiac CTA and MR Images"; Proceedings of the 30th on Applied Imagery Pattern Recognition Workshop (AIPR '01); IEEE Computer Society; Oct. 10-12, 2001; pp. 21-24.
Mroz, Lukas and Hauser, Helwig; "RTVR: A Flexible Java Library for Interactive Volume Rendering"; Proceedings of the Conference on Visualization '01 (VIS '01); IEEE Computer Society, Washington D.C., USA; Oct. 21-26, 2001; pp. 279-286.
Li et al.; "Methods for Efficient, High Quality Volume Resampling in the Frequency Domain"; Proceedings of the Conference on Visualization '04 (VIS '04); IEEE Computer Society, Washington D.C., USA; Oct. 10-15, 2004; pp. 3-10.
Hurdal, Monica K., Kurtz, Kevin W., and Banks, David C.; "Case Study: Interacting with Cortical Flat Maps of the Human Brain"; Proceedings of the Conference on Visualization '01 (VIS '01); IEEE Computer Society, Washington D.C., USA; Oct. 21-26, 2001; pp. 469-472.
Drebin, Robert A., Carpenter, Loren and Hanrahan, Pat; "Volume Rendering"; Proceedings of the 15th Annual Conference on Computer Graphics and Interactive Techniques (SIGGRAPH '88); Richard J. Beach (Ed.); ACM, New York, New York, USA; Aug. 1988; pp. 65-74.
Lombeyda, Santiago et al.; "Scalablbe Interactive Volume Rendering using Off-the-shelf Components"; Proceedings of the IEEE 2001 Symposium on Parallel and Large-data Visualization and Graphics (PVG '01); IEEE Press, Piscataway, New Jersey, USA; Oct. 22-23, 2001; pp. 115-121.
Brechiesen, Ralph; "Real-time volume rendering with hardware-accelerated raycasting"; Analysis, Apr. 2006; 43 pages; Retrieved from <http://www.mendeley.com/research/real-time-volume-rendering-with-hardwareaccelerated-raycasting/>.
Engel, Klaus and Ertl, Thomas; "Interactive High-Quality Volume Rendering With Flexible Consumer Graphics Hardware"; Eurographics STAR-State-of-the-Art-Report S2; 24 pages; 2002.
Oudshoorn, Juri A.; "Ray Tracing as the Future of Computer Games"; Department of Computer Science, University of Utrecht, in conjunction with Davilex Software; Nov. 1999; pp. 1-50.
Shwenden, Mark and Curtis, Carolyn; "Silicon Graphics Onyx2 Deskside Workstation Owner's Guide"; Mountain View, Califorinia; 1999; 146 pages.
Dai Lei, First Notification of Office Action—PCT Application Entry into the National Phase, Application No. 200980119964.5, Apr. 5, 2012, 8 pages, The State Intellectual Property Office of China—Receiving Department, Haidian, Beijing.
CN-Knowhow Intellectual Property Agent Limited; Response to First Office Action, Application No. 200980119964.5, Aug. 19, 2012, 6 pages, CN-Knowhow Intellectual Property Agent Limited, Beijing China.
Ralph Brecheisen, Real-time volume rendering with hardware-accelerated raycasting, Analysis, Apr. 2006, 43 pages.
K. Engel and T. Ertl, Interactive High-Quality Volume Rendering with Flexible Consumer Graphics Hardware, Eurographics State-of-the-Art Report S2, 2002, 24 pages.
Juri A. Oudshoorn, Ray Tracing as the Future of Computer Games, Department of Computer Science, University of Utrecht, Nov. 1999, 50 pages.
Joe Kniss, Gordon Kindlmann, Charles Hansen; Multi-Dimensional Transfer Functions for Interactive Volume Rendering, Scientific Computing and Imaging Institute, Oct. 21, 2001;15 pages; School of Computing, University of Utah, Utah, USA.

* cited by examiner

US 8,736,600 B2

SYSTEMS AND METHODS FOR IMAGING A THREE-DIMENSIONAL VOLUME OF GEOMETRICALLY IRREGULAR GRID DATA REPRESENTING A GRID VOLUME

CROSS-REFERENCE TO RELATED APPLICATIONS

The priority of U.S. Provisional Patent Application No. 61/059,716, filed on Jun. 6, 2008, is hereby claimed, and the specification thereof is incorporated herein by reference.

STATEMENT REGARDING FEDERALLY SPONSORED RESEARCH

Not applicable.

FIELD OF THE INVENTION

The present invention relates generally to systems and methods for imaging a three-dimensional ("3D") volume of geometrically irregular grid data representing a grid volume. More particularly, the present invention relates to imaging geometrically irregular grid data, in real-time, using various types of probes and corresponding displays.

BACKGROUND OF THE INVENTION

Typical commercialized petroleum reservoir visualization software helps petroleum and reservoir engineers and geoscientists see the results from static or dynamic simulations and visually compare iterative "what if" scenarios. Many reservoir models are often described as a disconnected curvilinear grid volume, also called a "3D grid," where each grid cell has clearly defined hexahedronal geometry. The software shows different views of the reservoir with particular attributes (e.g. gas saturation) of the reservoir. The edges, top, and bottom of the reservoir can be seen by rotating the view.

Visualization can be used at four different points in the reservoir characterization and simulation process: 1) after gridding, 2) after initialization, 3) during simulation, and 4) after simulation. Visualization software typically allows the representation of any simulation attribute, instant switching between attributes, and the ability to set data thresholds with unique displays of cells that are restricted to specified data ranges. A visualization model may include a single layer, or multi-layer views wherein cells are stripped away to reveal the inside of the model. They can also be constructed to show a full display of corner points and local refinement for grid volumes. The traditional approach to setting up a modeling framework is a step-wise, process, not done in real-time, that employs two-dimensional ("2D") interface dialog boxes with input fields and progress bars.

Geoscientists examine a variety of data types in the effort to find oil or gas. Seismic data is generally used to identify continuous reflections (representing horizons) and discontinuities (representing faults or other structural components) that form the structural framework of reservoirs containing hydrocarbons. This data type provides high resolution horizontal information, but lacks vertical detail. During oil and gas exploration, well data provides petrophysical and geological information from wire-line logs and cores. This well data contains high resolution vertical information, but lacks horizontal detail between wells. Sophisticated earth modeling tools integrate information from these two data types thus, optimizing both horizontal and vertical resolution. The result is a static model that can be used to build reservoir models to predict the oil and/or gas fluid flow and facilitate hydrocarbon production planning.

Visualization shows simulation effects on a specific area of the reservoir, represented in a model, through the use of 3D graphics objects. Simulation attributes display as color on the graphics objects and represent reservoir structure. As a result, physical changes in the reservoir, such as gas cap movement or pressure changes, can be easily evaluated. The ability to visualize a simulation model at any angle during the course of the simulation improves reservoir understanding.

A 3D reservoir model may be presented as hexahedral grid cells, which can be topologically structured or unstructured and geometrically regular or irregular. Curvilinear grid volumes, which are topologically structured and geometrically irregular, are more typical in reservoirs and are therefore, of particular interest. A 3D grid may be defined as:

$$\text{cell}=f(I,J,K)=(v_1,v_2\ldots v_8,a_1,a_2\ldots a_n)$$

where $v_1, v_2 \ldots$ and $v_8$ are eight vertices for the cell and $a_1, a_2 \ldots$ and $a_n$ are attributes. 3D grids are I layers thick, J cells wide, K cells deep, which contain cells with coordinates (I, J, K) referred to as grid coordinates. Grid Coordinates (I, J, K) are typically used in an index domain, while Cartesian (world) coordinates (x, y, z) are typically used in a sampling domain.

Some commercial applications and research can visualize 3D grids and provide basic 3D scene interactive manipulations, such as rotation and zoom capabilities. However, 2D menus are used to define particular features, such as I, J, or K layers. For large or complicated volumes, image generation requires so much time that the software must display a progress bar. Although users can be trained to set parameters in 2D menus while working in 3D, they may become frustrated by this awkward interaction.

As referenced above, a 3D reservoir model is either topologically structured or unstructured, and volumes are geometrically regular or irregular. Unstructured volumes can easily be resampled to a regular structured volume using a rendering algorithm. Research for unstructured volume visualization includes the widely used Projected Tetrahedral technique. Many other extended and enhanced algorithms have also been published. Another algorithm used for visualizing geoscience data is incremental slicing, which was first introduced by Yagel, et al. in *Hardware Assisted Volume Rendering of Unstructured Grids by Incremental Slicing*, IEEE Visualization, 1996, pp. 55-62. The basic idea behind this algorithm is to slice the whole grid volume along the viewing direction and render the slices from back to front. For surface volume rendering, the well-known Marching Cubes algorithm can be used for rendering both regular and irregular grid cells. The challenge of volume visualization, however, lies in determining which algorithm best fits a particular domain and task.

Volume roaming (resizing or moving a region) is a common visualization technique used to focus on a dynamic subvolume of the entire data set in several oil and gas applications. GeoProbe®, which is a commercial-software package marketed by Landmark Graphics Corporation for use in the oil and gas industry, employs this basic technique using a sampling probe. The Geoprobe® sampling probe is described in U.S. Pat. No. 6,765,570, which is assigned to Landmark Graphics Corporation and is incorporated herein by reference. The sampling probe described in U.S. Pat. No. 6,765,570, however, only renders structured data (voxels) in real-time. In other words, the sampling probe does not address the need to render unstructured grids—much less geometrically irregular grid data—in real-time.

Although other publications (e.g. Speray and Kennon, in Volume Probes: Interactive Data Exploration on Arbitrary Grids, Computer Graphics, Vol. 24, No. 5 (November 1995, pp. 5-12)) describe a probe, none appear capable of rendering geometrically irregular grid data in real-time.

There is therefore, a need for imaging (rendering) 3D grids of geometrically irregular grid data in real-time.

SUMMARY OF THE INVENTION

The present invention meets the above needs and overcomes one or more deficiencies in the prior art by providing systems and methods for imaging 3D grids of geometrically irregular grid data in real-time.

In one embodiment the present invention includes a method for imaging a three-dimensional volume of geometrically irregular grid data representing a grid volume using a computer processor, which comprises: i) selecting a grid probe within the grid volume, the grid probe defined by a bounding box in a sampling domain, the grid volume comprising multiple cells and the grid data comprising a normal vector and a geometry for each face of each cell, split flag data for each cell, an attribute for each cell and an attribute data value for each cell wherein the split flag data comprises data representing each face of a respective cell and its position relative to a face of another cell; ii) mapping extents of the bounding box from the sampling domain to an index domain; iii) rendering an image of the grid probe within the grid volume, the image comprising the grid data only within at least a portion of the extents of the bounding box; and iv) repeating the rendering step in response to movement of the grid probe within the grid volume so that as the grid probe moves, the image of the grid probe is redrawn at a rate sufficiently fast to be perceived as moving in real-time.

In another embodiment the present invention includes a non-transitory program carrier device tangibly carrying computer executable instructions for imaging a three-dimensional volume of geometrically irregular grid data representing a grid volume. The instructions are executable to implement: i) selecting a grid probe within the grid volume, the grid probe defined by a bounding box in a sampling domain, the grid volume comprising multiple cells and the grid data comprising a normal vector and a geometry for each face of each cell, split flag data for each cell, an attribute for each cell and an attribute data value for each cell wherein the split flag data comprises data representing each face of a respective cell and its position relative to a face of another cell; ii) mapping extents of the bounding box from the sampling domain to an index domain; iii) rendering an image of the grid probe within the grid volume, the image comprising the grid data only within at least a portion of the extents of the bounding box; and iv) repeating the rendering step in response to movement of the grid probe within the grid volume so that as the grid probe moves, the image of the grid probe is redrawn at a rate sufficiently fast to be perceived as moving in real-time.

Additional aspects, advantages and embodiments of the invention will become apparent to those skilled in the art from the following description of the various embodiments and related drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The present invention is described below with references to the accompanying drawings in which like elements are referenced with like reference numbers, and in which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

Overview

The need for real-time displays in today's modeling world is critical; waiting even a single minute can often seem painful and frustrating. Therefore, the visualization design goal is to render large 3D grids of geometrically irregular grid data representing a grid volume responsive to input at rendering rates sufficiently fast to be perceived in real-time. To penetrate and analyze such data in real-time, a number of visualization techniques are addressed herein. In order to fully understand these techniques, it is necessary to describe some details around 3D grids and their topology.

Figure 12A:
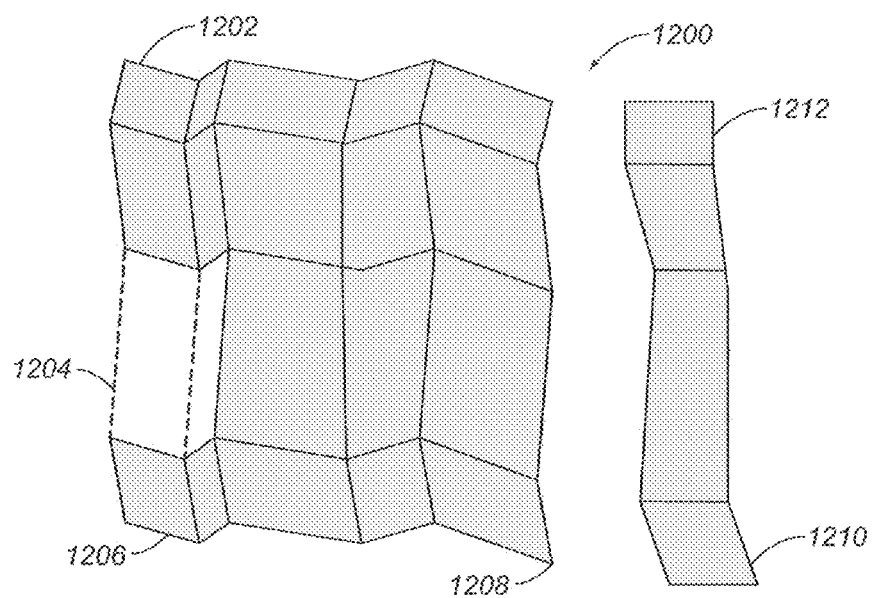
FIG. 12A illustrates one layer of geometrically irregular grid data from a 3D grid.

Referring now to FIG. 12A, a layer 1200 of geometrically irregular grid data from a 3D grid is illustrated. The layer 1200 may be used to map grid data from a grid volume onto a probe. To specify the continuity of adjacent cells, a byte, representing multiple split flags, is used. Six of the bits in a byte are used to indicate whether the cell split occurred left, right, up, down, near, or far, relative to adjacent cells. The seventh bit is used to specify a dead cell. The eighth bit is used for "inactive" cells. Inactive cells are not dead, but are invisible for particular probes. The data representing each bit (split flag) may be referred to collectively as split flag data.

Cell 1202 has coordinates of (1,1,1). The only splits relative to cell 1202 occurred left and up, which are shown by no cell to the left or above the cell 1202.

Cells that do not exist, as in cell 1204, are referred to as "dead" cells and are not displayed. The cells adjacent to the dead cells possibly represent geological discontinuities, such as faults, other structural features, or stratigraphic changes. Geological or petrophysical attributes are displayed as color on the cells. The shading and color must be per cell, but cannot be per vertex. Any form of interpolation of color or vertex is not desired, because petroleum geoscientists and engineers want to see and understand the attribute magnitude at each cell. Each cell therefore, includes an attribute and a corresponding attribute data value. In addition, each face of each cell represents a particular geometry and includes a normal vector that controls the shading for that face. Thus, each cell includes grid data associated therewith that comprises a normal vector and a geometry for each face of the cell, split flag data, an attribute and its corresponding data value. The attribute, and its corresponding data value, the geometry and the normal vector are commonly referred to as 3D graphics quads.

Cell 1206 has coordinates of (1,4,1). The splits relative to cell 1206 occurred left and down, which are shown by no cell to the left or below the cell 1206.

Cell 1208 has coordinates of (1,4,5). The splits relative to cell 1208 occurred right and down, which are shown by no cell to the right or below the cell 1208.

Cell 1210 has coordinates of (1,4,6). The splits relative to cell 1210 occurred left, right and down, which are shown by no cell to the left, right or below the cell 1210.

Cell 1212 has coordinates of (1,1,6). The splits relative to cell 1212 occurred left, right and up, which are shown by no cell to the left, right or above the cell 1212.

Because interpolation of vertices and colors should be avoided, polygon reduction (e.g. using a polygon for the faces of cells on the same plane) can not be applied. These requirements reaffirm the need for the different types of probes and displays provided herein by the present invention.

The present invention reduces image generation (rendering) time by use of a probe-based interface where users can identify the appropriate parameter selection without the need of a 2D interface. A probe-based interface, like the GeoProbe® sampling probe, renders a dynamic subset of the entire data volume, which may be used to focus on a region of interest. The present invention extends the probe concept to interface with grid data (including split flag data) from a grid volume comprising multiple cells. As used herein, the term probe refers to a grid probe, which may include, for example, a Box-Probe, a Quad-Probe, a Cut-Probe, a Slice-Probe, and a Filter-Probe.

Figure 12B:
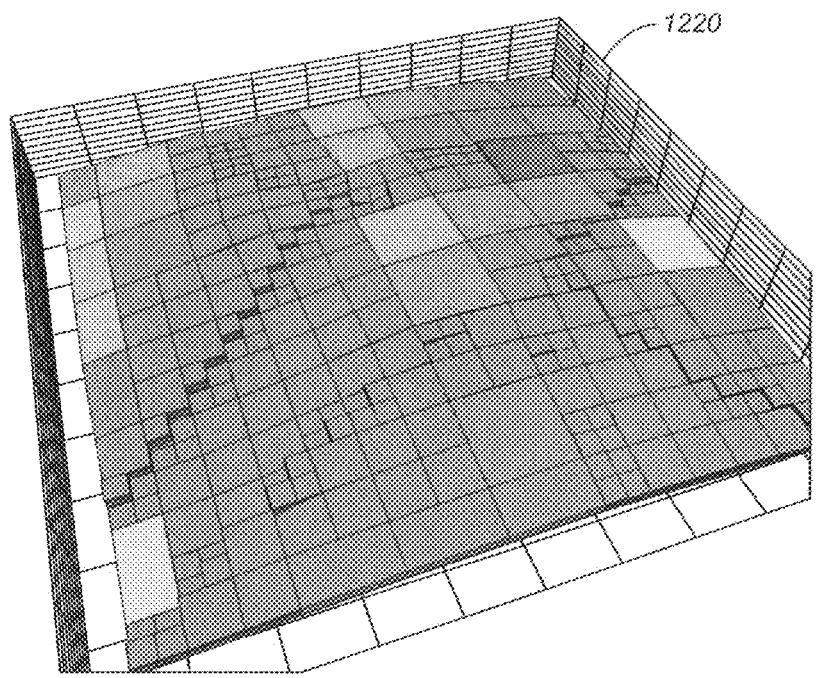
FIG. 12B is an image illustrating Local Grid Refinement (LGR).

Referring now to FIG. 12B, an image 1220 illustrates Local Grid Refinement (LGR), which is applied to add detail where it is justified by data availability and to keep coarse resolution where less data is available. To handle LGR, each probe contains multiple display objects, and each display object is connected with one LGR grid. A parent-child relationship between grid cells is passed into the display object. According to the parent range information, a child queries its own range from grid data, retrieves a sub-grid, and then builds geometry for a particular display. There are 18 LGR grid cells in the image 1220.

Different types of visualization displays may be used in connection with certain probes, which include, for example, a ShellDisplay, a PlaneDisplay, a CellDisplay and a FilterDisplay. Each type of display may be used to examine different geological layering, the distribution of geological faces and their internal petrophysical properties such as, for example: outside geometry (ShellDisplay), layers or cross sections (PlaneDisplay), distribution of flow units or geobodies (FilterDisplay), or the internal grid cell geometry (CellDisplay). Each type of display may therefore, be used to validate or identify potential problems using the probe thereby, eliminating the need to stop, initiate a new set of commands, and then wait for a particular display to render. The present invention therefore, provides interactive, real-time images that respond to changes in the probe size, shape, and location.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input, Picasso, which is a commercial software application marketed by Landmark Graphics Corporation, may be used as an interface application to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Figure 1:
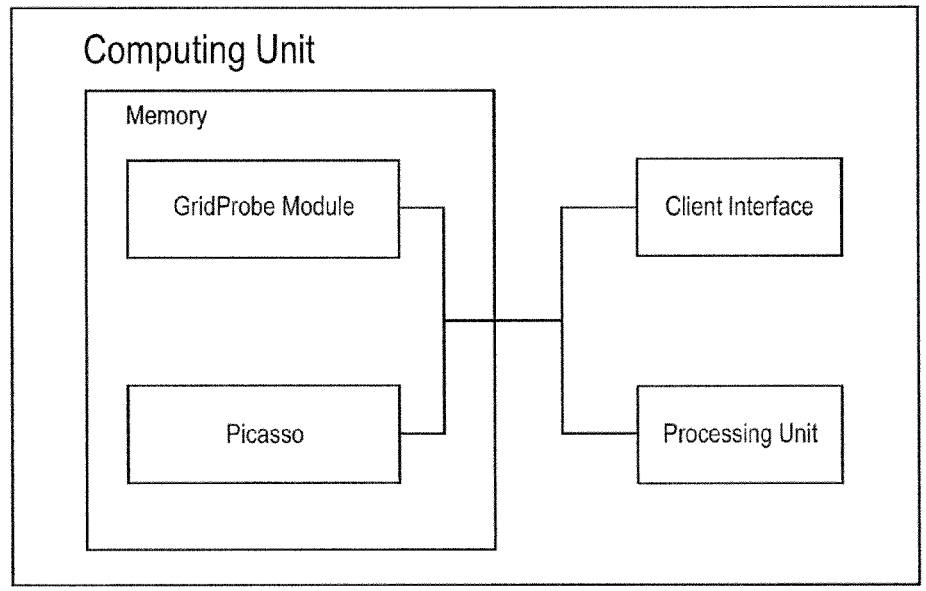
FIG. 1 is a block diagram illustrating one embodiment of a computer system for implementing the present invention.

Referring now to FIG. 1, a block diagram of a system for implementing the present invention on a computer is illustrated. The system includes a computing unit, sometimes referred to a computing system, which contains memory, application programs, a client interface, and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the methods described herein and illustrated in FIGS. 3-11. The memory therefore, includes a visualization module, referred to as the GridProbe Module in FIG. 1, which enables the methods illustrated and described in reference to FIGS. 5-11. The GridProbe Module may also interact with Picasso and other related software applications as further described in reference to FIGS. 2A and 2B.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

Figure 2A:
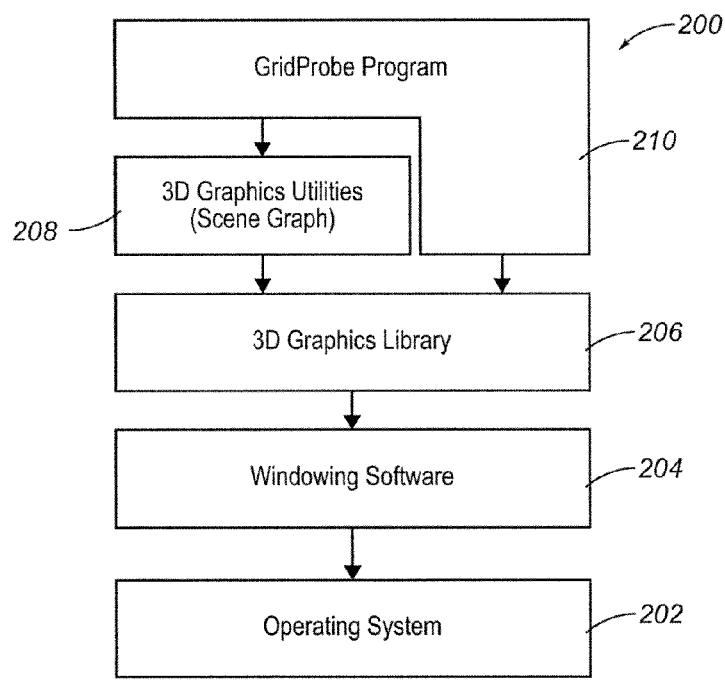
FIG. 2A is a block diagram illustrating one embodiment of a software program for implementing the present invention.

Referring now to FIG. 2A, a block diagram of a program for implementing the present invention on software is illustrated.

The present invention may be implemented using hardware, software or a combination thereof, and may be implemented in a computer system or other processing system. One embodiment of a software or program structure 200 for implementing the present invention is shown in FIG. 2A. At the base of program structure 200 is an operating system 202. Suitable operating systems 202 include, for example, the UNIX® operating system, or Windows NT® from Microsoft Corporation, or other operating systems as would be apparent to one of skill in the relevant art.

Windowing software 204 overlays operating system 202. Windowing software 204 is used to provide various menus and windows to facilitate interaction with the user, and to obtain user input and instructions. Windowing software 204 can include, for example, Microsoft Windows™, X Window System™ (registered trademark of Massachusetts Institute of Technology), and MOTIF™ (registered trademark of Open Software Foundation Inc.). As would be readily apparent to one of skill in the relevant art, other menu and windowing software could also be used.

A 3D graphics library 206 overlays Windowing software 204. The 3D graphics library 206 is an application programming interface (API) for 3D computer graphics. The functions performed by 3D graphics library 206 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly preferred 3D graphics library 206 is OpenGL®. The OpenGL® API is a well known multi-platform industry standard that is hardware, window, and operating system independent. OpenGL® is designed to be callable from C, C++, FORTRAN, Ada and Java™ programming languages. OpenGL® performs each of the functions listed above for 3D graphics library 206. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL® is network transparent. OpenGL® is described in more detail in the OpenGL® Programming Guide (ISBN: 0-201-63274-8) and the OpenGL® Reference Manual (ISBN: 0-201-63276-4), the entirety of both of which are incorporated herein by reference.

3D graphics utilities 208 overlay the 3D graphics library 206. The 3D graphics utilities 208 is an API for creating real-time, multi-processed 3D visual simulation graphics applications. The 3D graphics utilities 208 provide functions that bundle together graphics library state control functions such as lighting, materials, texture, and transparency. These functions track state and the creation of display lists that can be rendered later. A particularly preferred set of 3D graphics utilities is offered in Picasso.

A GridProbe program 210 overlays 3D graphics utilities 208 and the 3D graphics library 206. The GridProbe program 210 interacts with, and uses the functions carried out by, each of the 3D graphics utilities 208, the 3D graphics library 206, the windowing software 204, and the operating system 202 in a manner known to one of skill in the relevant art.

The GridProbe program 210 of the present invention is preferably written in an object oriented programming language to allow the creation and use of objects and object functionality. A particularly preferred object oriented programming language is Java™. In carrying out the present invention, the GridProbe program 210 creates one or more probe objects. As noted above, the probe objects created and used by the GridProbe program 210 are also referred to herein as grid probes or probes. GridProbe program 210 manipulates the probe objects so that they have the following attributes.

A probe corresponds to a sub-volume of a larger grid volume. Particularly, a probe defines a sub-set that is less than the complete data set of cells for a grid volume. A probe could be configured to be equal to or coextensive with the complete data set of cells for a grid volume, but the functionality of the present invention is best carried out when the probe corresponds to a sub-volume and defines a sub-set that is less than the complete data set of cells for a grid volume.

By using probes that are a sub-volume of the larger grid volume, the quantity of data that must be processed and re-drawn for each frame of an image is dramatically reduced, thereby increasing the speed with which the image can be re-drawn. The volume of a three-dimensional cube is proportional to the third power or "cube" of the dimensions of the three-dimensional cube. Likewise, the quantity of data in a grid volume is proportional to the third power or "cube" of its size. Therefore, the quantity of data in a sub-volume of a larger grid volume will be proportional to the "cubed root" ($\sqrt[3]{}$) of the quantity of data in the larger grid volume. As such, the quantity of data in a probe of the present invention may be proportional to the "cubed root" ($\sqrt[3]{}$) of the quantity of data in the grid volume of which it is a sub-volume. By only having to process the sub-set of data that relates to the sub-volume of the probe, the present invention can re-draw an image in response to user input at a rate sufficiently fast that the user perceives an instantaneous or real-time change in the image, without perceptible delay or lag. In other words, an image that is rendered at a rate of at least 10 frames per second.

The probes of the present invention can be interactively changed in shape and/or size, and interactively moved within the larger grid volume. The outside geometry or surfaces of a probe can be interactively drawn while the probe is being changed in shape and/or size or while the probe is being moved. As a result, the internal structures or features of the probe may be revealed.

A probe can be used to cut into another probe, and the intersection of the two probes can be imaged. A probe can also be used to filter data in accordance with filter criteria representing an attribute data range.

Figure 2B:
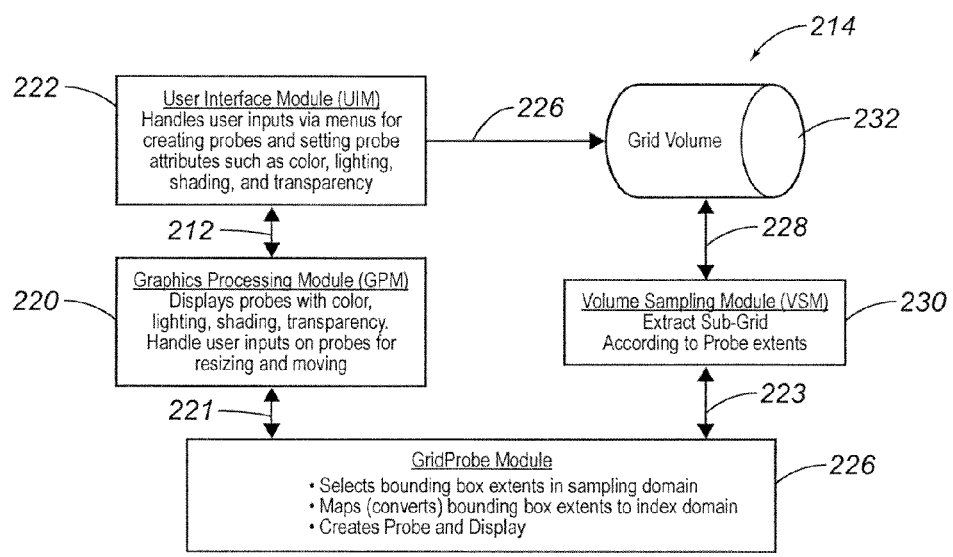
FIG. 2B is a block diagram illustrating an architecture for the software program in FIG. 2A.

Referring now to FIG. 2B, a block diagram of an architecture 214 for the program 200 in FIG. 2A is illustrated.

The 3D graphics utilities 208 include a User Interface Module (UIM) 222, a Graphics Processing Module (GPM) 220, and a Volume Sampling Module (VSM) 230. The Grid-Probe program 210 includes a GridProbe Module 226. UIM 222 and GPM 220 communicate via a bi-directional pathway 212. UIM 222 sends instructions and requests to VSM 230 through GPM 220 and GridProbe Module 226 via bi-directional pathways 221, 223. UIM 222 interacts with Grid Volume 232 through pathway 226.

Grid data from Grid Volume 232 is transferred to VSM 230 via pathway 228. VSM 230 transfers data to GPM 220 through GridProbe Module 226 via bi-directional pathways 221, 223. Grid Volume 232 stores the grid data in a manner well known to one of skill in the relevant art, which may include grid data representing multiple different volumes.

UIM 222 handles the user interface to receive commands, instructions, and input data from the user. UIM 222 interfaces with the user through a variety of menus through which the user can select various options and settings, either through keyboard selection or through one or more user-manipulated input devices, such as a mouse or a 3D pointing device. UIM 222 receives user input as the user manipulates the input device to move, size, shape, etc. a grid probe.

UIM 222 inputs the identification of one or more grid volumes from Grid Volume 232 to use for imaging and analysis. When a plurality of grid volumes are used, the data value for each of the plurality of grid volumes represents a different physical parameter or attribute for the same geographic space. By way of example, a plurality of grid volumes could include a geology volume, a temperature volume, and a water-saturation volume.

UIM 222 inputs information to create one or more probes. Such information may include, for example, probe type, size, shape, and location. Such information may also include, for example, the type of display and imaging attributes such as color, lighting, shading, and transparency (or opacity). By adjusting opacity as a function of data value, certain portions of the grid volume are more transparent, thereby allowing a viewer to see through surfaces. As would be readily apparent to one skilled in the art, data values with greater opacity (less transparency) will mask the imaging or display of data values with lower opacity (more transparency). Conversely, data values will less opacity and greater transparency will permit the imaging or display of data values with greater opacity and lower transparency.

UIM 222 receives input from the user for sizing and shaping the probes. As described in more detail below, in a preferred embodiment of the present invention, the shape and/or size of a probe may be changed by clicking onto manipulators or the probe display and making changes in the dimensions of the probe in one or more directions. A manipulator refers to a designated graphical representation on a surface of the probe, which may be used to move, reshape or re-size the probe. Manipulators may also be used to identify boundaries or extents for creating certain types of probes. A manipulator is preferably displayed in a color that is different from the colors being used to display the features or physical parameters of the grid data. UIM 222 receives input from the user to move the position or location of a probe within the grid volume. In a preferred embodiment, a user manipulates a mouse to click onto a manipulator or the probe display and move or re-size the probe.

UIM 222 also receives input from the user regarding the content of the displayed image. For example, the user can preferably select the content of the displayed image. The content of the displayed image could include only the probe, i.e., its intersection with the grid volume. Additionally, the probe could be displayed either with or without a bounding box that defines the outer geometry of the probe.

To carry out the foregoing functions, UIM 222 sends a request to VSM 230 to load or attach the grid volumes identified by the user. UIM 222 communicates via bi-directional pathway 212 with GPM 220 that carries out the display and imaging.

GPM 220 processes data for imaging probes with the color, lighting, shading, transparency, and other attributes selected by the user. To do so, GPM 220 uses the functions available through 3D graphics library 206 and 3D graphics utilities 208 described above. The user can select (through UIM 222) to display only the one or more probes that have been created. Alternatively, the user can select to display one or more probes, as well as the grid volume outside of the probes, i.e. cells within the grid volume that do not intersect any of the probes that are being displayed. Probes that are being displayed may be referred to herein as active probes.

GPM 220 processes the re-shaping and move requests that are received by UIM 222 from the user. GPM 220 draws the re-shaped probe in accordance with the user-selected attributes (color, lighting, shading, transparency, etc.). As the user inputs a change in shape for a probe, the image with selected attributes is re-drawn sufficiently fast to be perceived in real-time by the user. Similarly, GPM 220 draws the probe in the new position or location in accordance with the user-selected attributes (color, lighting, shading, transparency, etc.). As the user moves the probe through the grid volume, the image of the probe with selected attributes is re-drawn sufficiently fast to be perceived in real-time by the user.

To carry out the foregoing functions, GPM 220 communicates via bi-directional pathway 212 with UIM 222 so that the information requested by the user is imaged or displayed with the selected attributes. GPM 220 obtains the needed data from Grid Volume 232 by sending a data request through the Grid-Probe Module 226 and the VSM 230 via bi-directional pathways 221, 223, 228.

The GridProbe Module 226 selects bounding box extents in the sampling domain based on input received from UIM 222 through GPM 220 regarding the type of probe and display selected. The GridProbe Module 226 then maps (converts) the bounding box extents from the sampling domain to the index domain. The GridProbe Module 226 then sends a request to VSM 230 via bi-directional pathway 223 for grid data from Grid Volume 232 that corresponds to the selected bounding box extents. The GridProbe Module 226 receives grid data corresponding to the bounding box extents from VSM 230 via bi-directional pathway 223. The GridProbe Module then creates (builds) the selected probe and display using the grid data from VSM 230 and transmits the selected probe and display to GPM 220 for rendering an image of the selected probe and display.

The primary function of VSM 230 is therefore, to extract the appropriate grid data within the bounding box extents from Grid Volume 232 at the request of GridProbe Module 226. VSM 230 receives requests for grid data from GridProbe Module 226 through bi-directional pathway 223. VSM 230 extracts the required sub-grid within the probe bounding box extents from Grid Volume 232 and transfers it to GridProbe Module 226. VSM 230 also may receive instructions from UIM 210 to load or attach other grid volumes identified by the user.

Method Description

Figure 3:
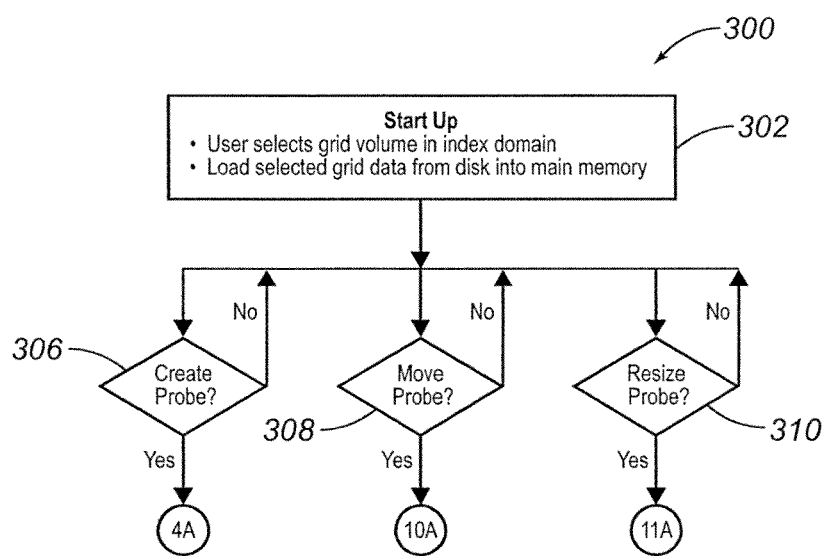
FIG. 3 is a flow diagram illustrating one embodiment of a method for implementing the present invention.

Referring now to FIG. 3, a flow diagram illustrates one embodiment of method 300 for implementing the present invention.

In step 302, the grid volumes to be used in the index domain may be selected using a conventional graphical user interface and input devices. The grid data for the selected grid volumes may be loaded from disc into main memory. Preferably, a default probe is created and drawn that is a subvolume of the selected grid volumes. The default probe may, for example, be a Quad-Probe, a Box-Probe, a Cut-Probe, a Slice-Probe or a Filter-Probe, however, is not limited to any particular size or shape.

In step 306, the method 300 determines whether to create a probe based on input received through a conventional graphical user interface. If the method 300 detects that a probe should be created, then the method 300 continues to FIG. 4. Otherwise, the method 300 may return to step 308 or step 310.

In step 308, the method 300 determines whether to move the probe based on input received through a conventional graphical user interface. If the method 300 detects that the probe should be moved, then the method 300 continues to FIG. 10. Otherwise, the method 300 may return to step 306 or step 310.

In step 310, the method 300 determines whether to re-size the probe based on input received through a conventional graphical user interface. If the method 300 detects that the probe should be re-sized, then the method 300 continues to FIG. 11. Otherwise, the method 300 may return to step 306 or step 308.

The functions determined by steps 306, 308 and 310 may be performed individually or simultaneously. Depending on the input, for example, one probe can be moved while another probe is re-sized. In addition, for example, one type of probe may be created while another type of prove is moved. While the functions determined by steps 306, 308 and 310 are being carried out, the image of the probe is being redrawn sufficiently fast to be perceived in real-time. Thus, at least one probe has to be created before the functions determined by steps 308 and 310 may be performed. After a probe is created, any of the functions determined by steps 306, 308 and 310 may be performed in any order.

Figure 4:
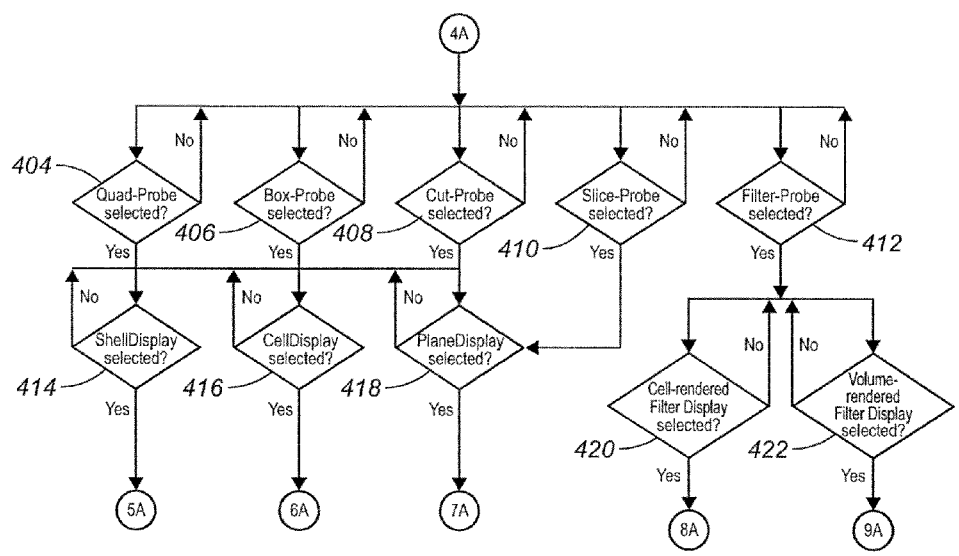
FIG. 4 is a continuation of the flow diagram illustrated in FIG. 3 for selecting a probe and display.

Referring now to FIG. 4, a continuation of the flow diagram in FIG. 3 is illustrated for selecting a probe and display. The steps illustrated in FIG. 4 are necessary to determine the preferred type of probe and display before creating the probe according to the methods illustrated in FIGS. 5-9.

Figure 18:
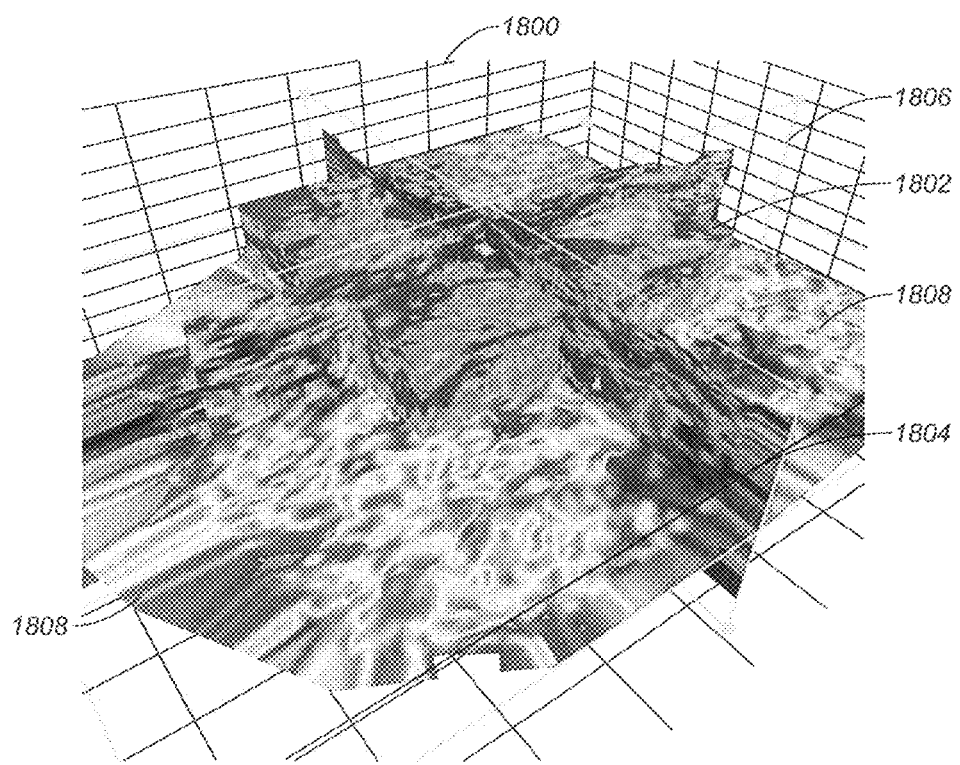
FIG. 18 is an image illustrating a Box-Probe PlaneDisplay created according to the flow diagram illustrated in FIG. 7.

In step 404, the method determines whether a Quad-Probe is selected based on input received through a conventional graphical user interface. A Quad-Probe defines a quad-plane bounding box. A quad plane is the region (R) in the sampling domain where (R) is a plane such as, for example, a cross-section or a map. An exemplary Quad-Probe bounding box is illustrated in FIG. 18 (1806). If a Quad-Probe was selected, then the method continues to steps 414, 416 or 418, which may be processed individually, in any order, or simultaneously. Otherwise, the method may return to steps 406, 408, 410 or 412.

Figure 16:
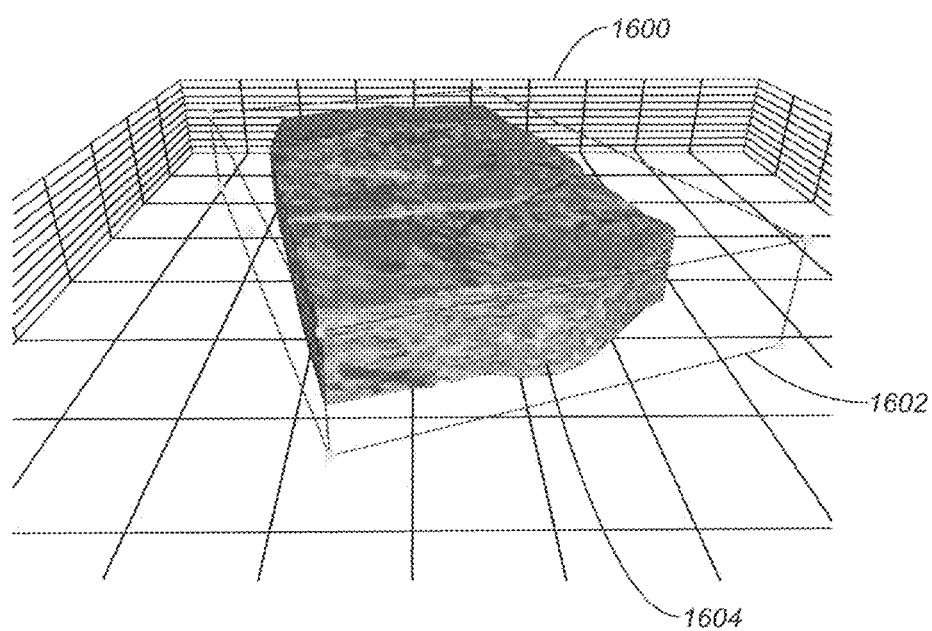
FIG. 16 is an image illustrating a Box-Probe ShellDisplay created according to the flow diagram in FIG. 5.

In step 406, the method determines whether a Box-Probe is selected based on input received through a conventional graphical user interface. A Box-Probe may be positioned in any geographic-coordinate space (world space), however, is preferably expressed as a square or rectangular bounding box with sampling coordinates that are standard x, y, z units. An exemplary Box-Probe bounding box is illustrated in FIGS. 16 (1602) and 17 (1702). If a Box-Probe was selected, then the method continues to steps 414, 416, or 418, which may be processed individually, in any order, or simultaneously. Otherwise, the method may return to steps 404, 408, 410 or 412.

Figure 19:
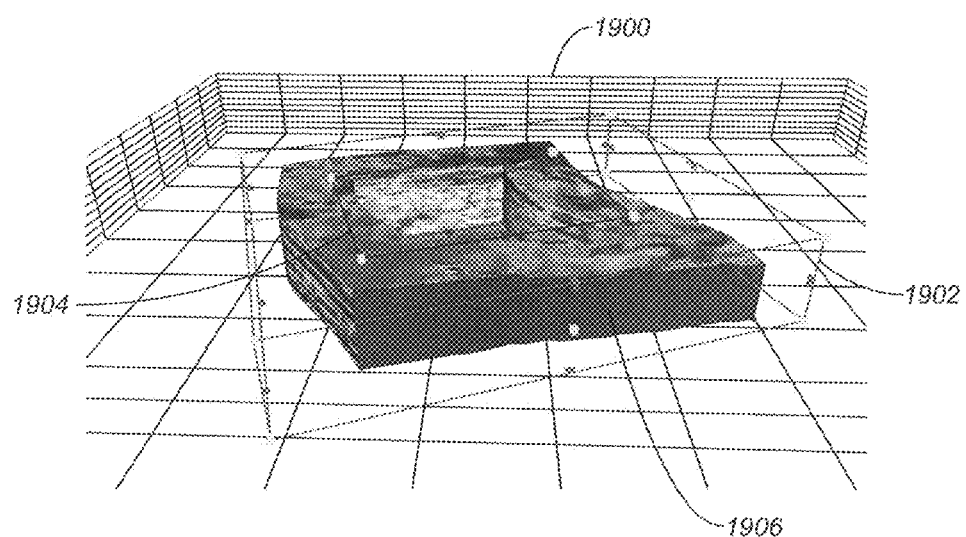
FIG. 19 is an image illustrating a Cut-Probe ShellDisplay created according to the flow diagram illustrated in FIG. 5.

In step 408, the method determines whether a Cut-Probe is selected based on input received through a conventional graphical user interface. A Cut-Probe is similar to a Box-Probe because it may be expressed as a square or rectangular (outer) bounding box and another square or rectangular (inner) bounding box that defines an area cut out of (removed) from a portion of the outer bounding box. The inner and outer bounding boxes may be expressed with coordinates that are standard x, y, z units. An exemplary Cut-Probe, with inner and outer bounding boxes, is illustrated in FIG. 19 (1902, 1904). If a Cut-Probe was selected, then the method continues to steps 414, 416, or 418, which may be processed individually, in any order, or simultaneously. Otherwise, the method may return to steps 404, 406, 410 or 412.

Figure 20:
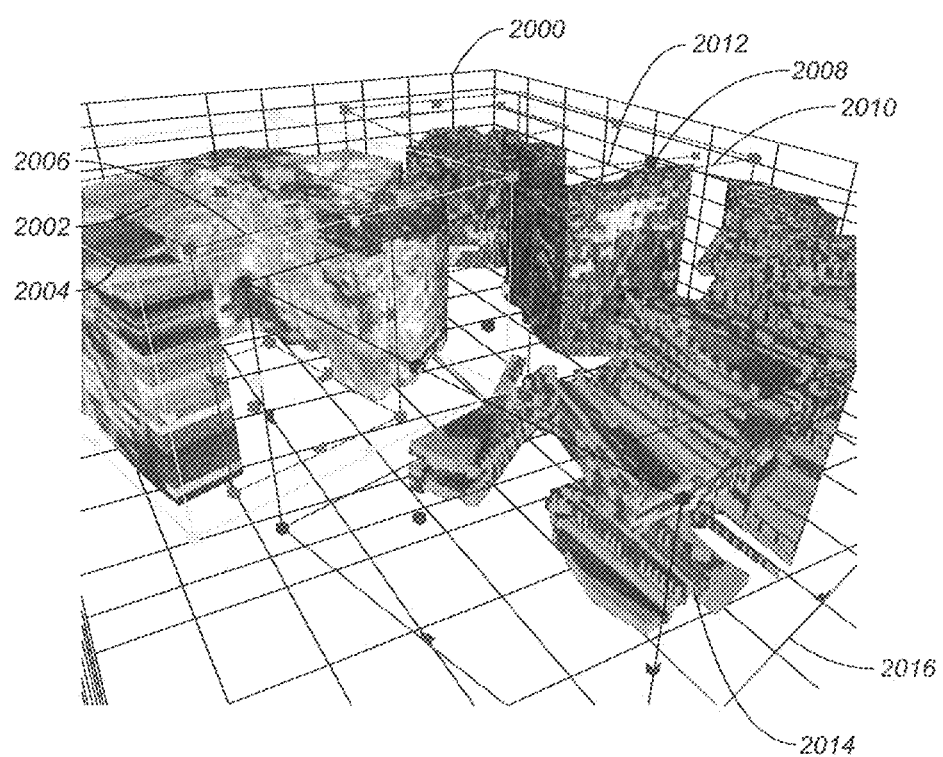
FIG. 20 is an image illustrating a Slice-Probe PlaneDisplay created according to the flow diagram in FIG. 7.

In step 410, the method determines whether a Slice-Probe is selected based on input received through a conventional graphical user interface. A Slice-Probe is similar to a Box-Probe and a Quad-Probe because it may be expressed as a square or rectangular bounding box, which includes manipulators on the edges of the bounding box and on opposite faces of the bounding box that form the extents of multiple quad-plane bounding boxes between the opposing manipulators. An exemplary Slice-Probe bounding box, with a quad-plane bounding box, is illustrated in FIG. 20 (2010, 2012). If a Slice-Probe was selected, then the method continues to step 418. Otherwise, the method may return to steps 404, 406, 408 or 412.

Figures 21A, 21B:
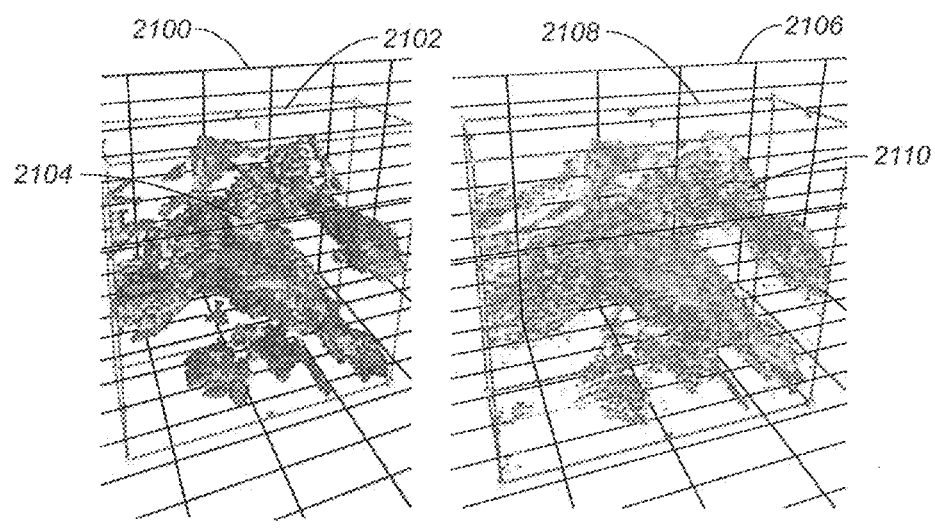
FIG. 21A is an image illustrating a cell-rendered Filter-Probe FilterDisplay created according to the flow diagram in FIG. 8.
FIG. 21B is an image illustrating a volume-rendered Filter-Probe FilterDisplay according to the flow diagram in FIG. 9.

In step 412, the method determines whether a Filter-Probe is selected based on input received through a conventional graphical user interface. A Filter-Probe is similar to a Box-Probe because it may be expressed as a square or rectangular bounding box, which displays specific cells that contain properties that meet defined conditions. Such conditions, for example, may represent critical thresholds of key petrophysical properties that are consistent with hydrocarbon production. An exemplary Filter-Probe bounding box is illustrated in FIGS. 21A (2102) and 21B (2108). If a Filter-Probe was selected, then the method continues to steps 420 or 422, which may be processed individually, in any order, or simultaneously. Otherwise, the method may return to steps 404, 406, 408 or 410.

As demonstrated herein, steps 404-412 may be processed individually, in any order, or simultaneously. After a particular type of probe is selected, one of the following displays may be selected for the probe.

In step 414, the method determines whether a ShellDisplay is selected based on input received through a conventional graphical user interface. If a ShellDisplay was selected, then the method continues to step 502. Otherwise, the method may return to steps 416 or 418.

In step 416, the method determines whether a CellDisplay is selected based on input received through a conventional graphical user interface. If a CellDisplay was selected, then the method continues to step 602. Otherwise, the method may return to steps 414 or 418.

In step 418, the method determines whether a PlaneDisplay is selected based on input received through a conventional graphical user interface. If a PlaneDisplay was selected, then the method continues to step 702. Otherwise, the method may return to steps 414 or 416.

In step 420, the method determines whether a cell-rendered FilterDisplay is selected based on input received through a conventional graphical user interface. If a cell-rendered FilterDisplay was selected, then the method continues to step 802. Otherwise, the method may return to step 422.

In step 422, the method determines whether a volume-rendered FilterDisplay is selected based on input received through a conventional graphical user interface. If a volume-rendered FilterDisplay was selected, then the method continues to step 902. Otherwise, the method may return to step 420.

The use, and combination, of the foregoing probes and displays enhance the visualization of desired features in a region of interest as demonstrated by the following methods describing each display.

Figure 5:
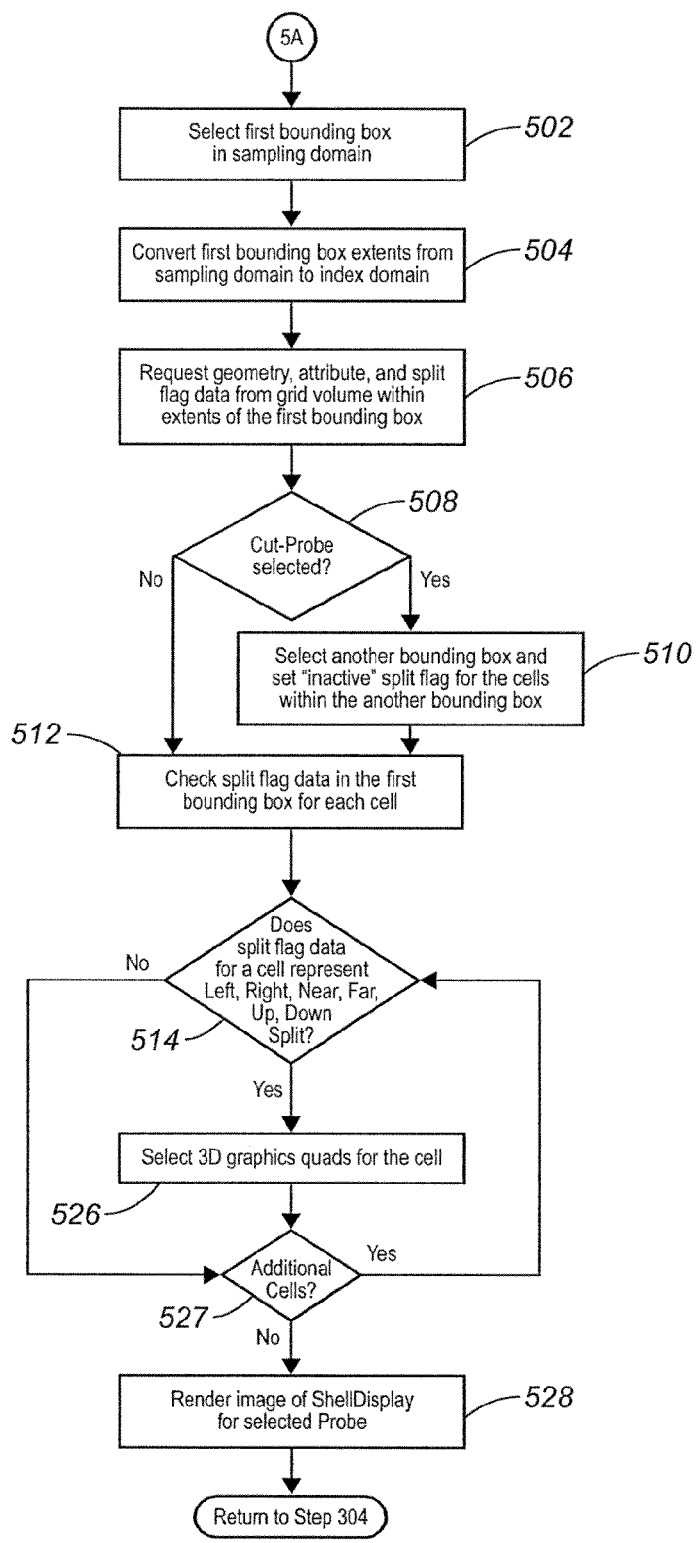
FIG. 5 is a continuation of the flow diagram illustrated in FIG. 4 for creating a probe with a ShellDisplay.

Referring now to FIG. 5, a continuation of the flow diagram in FIG. 4 is illustrated for creating a probe with a ShellDisplay. As demonstrated by the flow diagram in FIG. 4, the ShellDisplay may be used in connection with a Quad-Probe, a Box-Probe or a Cut-Probe.

In step 502, a first bounding box for the probe is selected in the sampling domain according to the type of probe selected.

In step 504, the first bounding box extents are converted (mapped) from the sampling domain to the index domain using the modules and techniques described in reference to FIG. 2.

In step 506, the geometry, attribute and split flag data for each cell within the extents of the first bounding box in the index domain are requested from the grid volume using the modules and techniques described in reference to FIG. 2.

In step 508, the method determines whether a Cut-Probe was selected. If a Cut-Probe was selected, then the method continues to step 510. Otherwise, the method continues to step 512.

In step 510, another bounding box is selected for the Cut-Probe, and the split flag for each cell in the another bounding box is set to inactive status.

In step 512, the split flag data in the first bounding box is checked for each cell using techniques well known in the art.

In step 514, the method determines if the split flag data for a cell in the first bounding box, which is not inactive, represents a left, right, near, far, up or down split. If the split flag data for the cell represents a left, right, near, far, up or down split, then the method continues to step 526. Otherwise, the method continues to step 527 to determine whether there are any additional cells in the first bounding box.

In step 526, 3-D graphics quads for the cell are selected using the modules and techniques described in reference to FIG. 2.

In step 527, the method determines whether there are additional cells in the first bounding box using techniques well known in the art. If there are additional cells in the first bounding box, then the method returns to step 514. Otherwise, the method continues to step 528.

In step 528, a ShellDisplay image for the selected probe is rendered using the modules and techniques described in reference to FIG. 2.

After step 528, the method returns to step 304 and waits for input or a request to move the probe, re-size the probe and/or create another probe.

Figure 13:
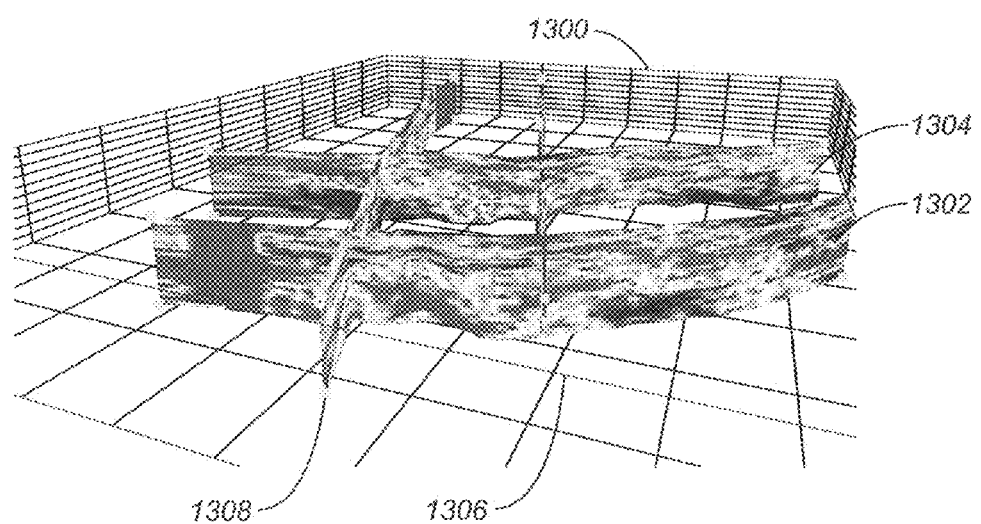
FIG. 13 is an image illustrating a Quad-Probe ShellDisplay created according to the flow diagram in FIG. 5.
Figure 14:
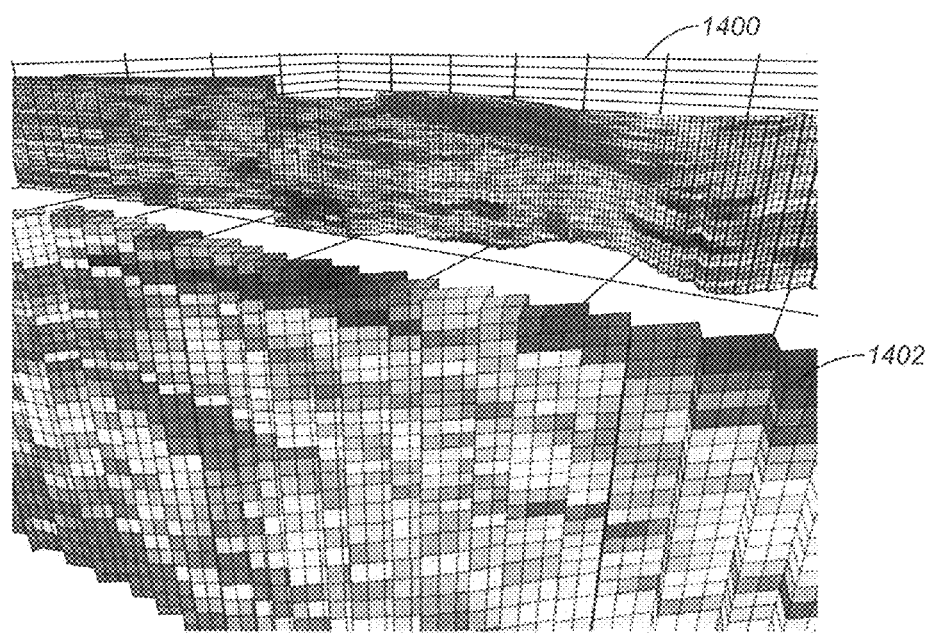
FIG. 14 is an image illustrating a Quad-Probe CellDisplay created according to the flow diagram in FIG. 6.

In FIG. 13, an image 1300 illustrates exemplary Quad-Probe ShellDisplays (1302, 1304, 1306, 1308) created according to the flow diagram in FIG. 5. The ShellDisplay may be used, for example, to interrogate a reservoir model with respect to the shape of a given reservoir and its internal arrangement of properties. The ShellDisplay resembles a silhouette in 3D, but it also draws split faces for each cell. Therefore, the inside of the probe is an empty "shell".

In FIG. 16, an image 1600 illustrates an exemplary Box-Probe ShellDisplay (1604) created according to the flow diagram in FIG. 5.

In FIG. 19, an image 1900 illustrates an exemplary Cut-Probe ShellDisplay (1906) created according to the flow diagram in FIG. 5.

Figure 6:
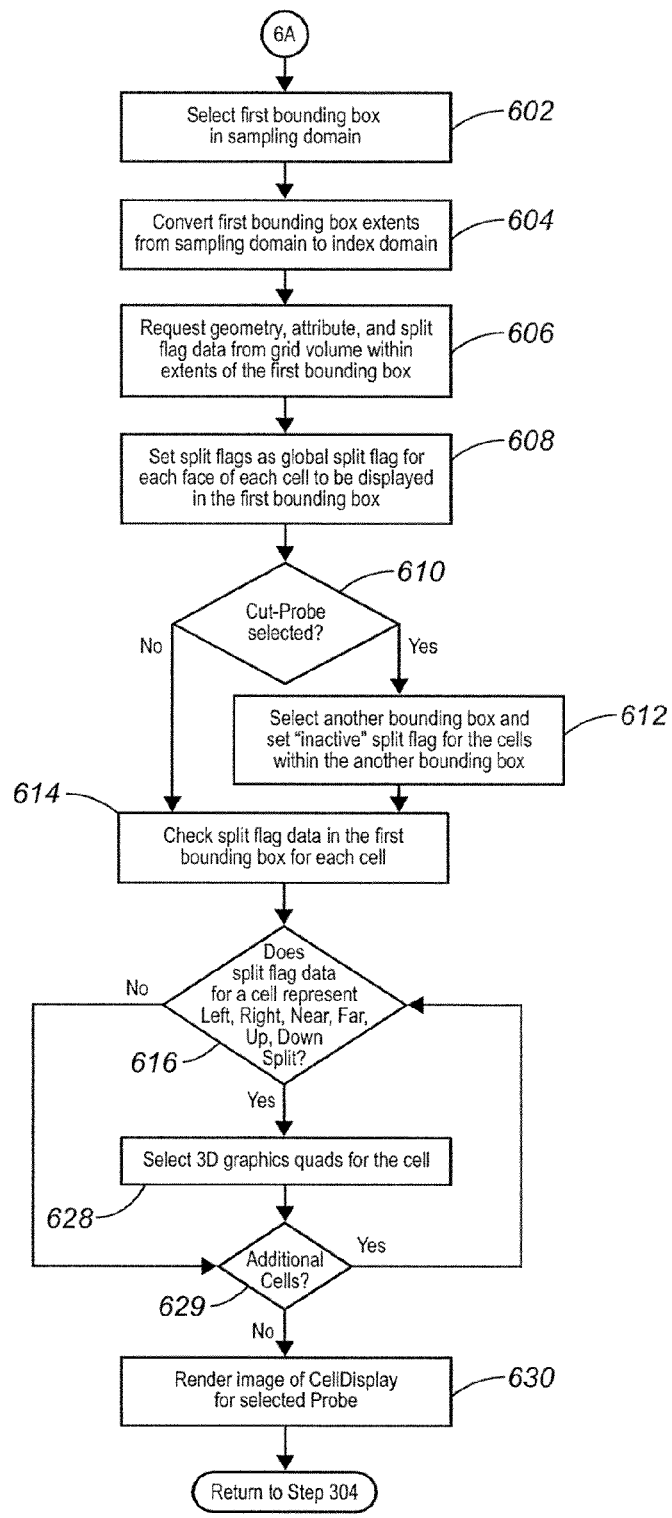
FIG. 6 is a continuation of the flow diagram illustrated in FIG. 4 for creating a probe with a CellDisplay.

Referring now to FIG. 6, a continuation of the flow diagram in FIG. 4 is illustrated for creating a probe with a CellDisplay. As demonstrated by the flow diagram in FIG. 4, the CellDisplay may be used in connection with a Quad-Probe, a Box-Probe or a Cut-Probe.

In step 602, a first bounding box for the probe is selected in the sampling domain according to the type of probe selected.

In step 604, the first bounding box extents are converted (mapped) from the sampling domain to the index domain using the modules and techniques described in reference to FIG. 2.

In step 606, the geometry, attribute and split flag data for each cell within the extents of the first bounding box in the index domain are requested from the grid volume using the modules and techniques described in reference to FIG. 2.

In step 608, split flags are set as a global split flag for each face of each cell to be displayed in the first bounding box.

In step 610, the method determines whether a Cut-Probe was selected. If a Cut-Probe was selected, then the method continues to step 612. Otherwise, the method continues to step 614.

In step 612, another bounding box is selected for the Cut-Probe, and a split flag for each cell in the another bounding box is set to inactive status.

In step 614, the split flag data in the first bounding box is checked for each cell using techniques well known in the art.

In step 616, the method determines if the split flag data for a cell in the first bounding box, which is not inactive, represents a left, right, near, far, up or down split. If the split flag data for the cell represents a left, right, near, far, up or down split, then the method continues to step 628. Otherwise, the method continues to step 629 to determine whether there are any additional cells in the first bounding box.

In step 628, 3-D graphics quads for the cell are selected using the modules and techniques described in reference to FIG. 2.

In step 629, the method determines whether there are additional cells in the first bounding box using techniques well known in the art. If there are additional cells in the first bounding box, then the method returns to step 616. Otherwise, the method continues to step 630.

In step 630, a CellDisplay image for the selected probe is rendered using the modules and techniques described in reference to FIG. 2.

After step 630, the method returns to step 304 and waits for input or a request to move the probe, re-size the probe and/or create another probe.

Figure 17:
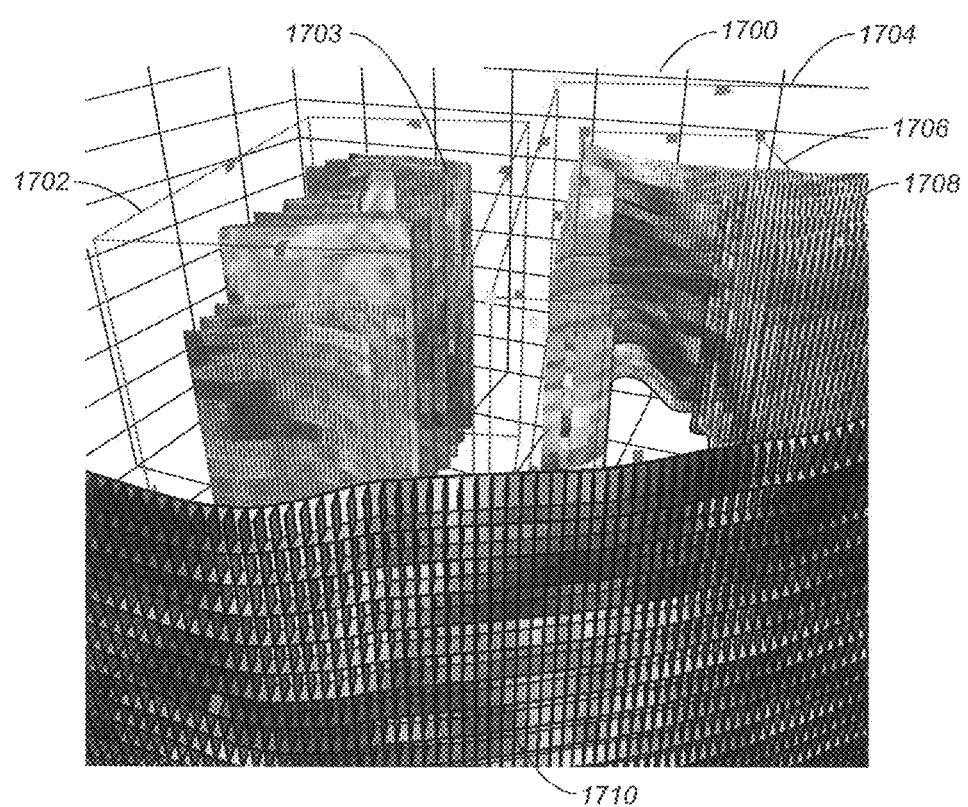
FIG. 17 is an image illustrating a Box-Probe CellDisplay created according to the flow diagram in FIG. 6.

In FIG. 17, an image 1700 illustrates an exemplary Box-Probe CellDisplay (1703), an exemplary Cut-Probe CellDisplay (1708) and an exemplary Quad-Probe CellDisplay (1710) created according to the flow diagram in FIG. 6. The CellDisplay is used to visualize the inside of any given cell and its immediate relationship to neighboring cells. The CellDisplay is similar to a ShellDisplay, but it draws the faces for each cell according to the split flags. For example, if the split is left, down, far, then the CellDisplay will draw the left, down, and far faces of the cells in the region defined by the probe. The CellDisplay uses bitwise operations applied to split flags for showing different combinations of the six faces. The CellDisplay can skip the static interval of I, J, and/or K. The Box-Probe and Cut-Probe skip every 5 layers along I. The CellDisplay is also used for showing the intersection of a cell with a particular plane in the Quad-Probe or Slice-Probe.

Figure 7:
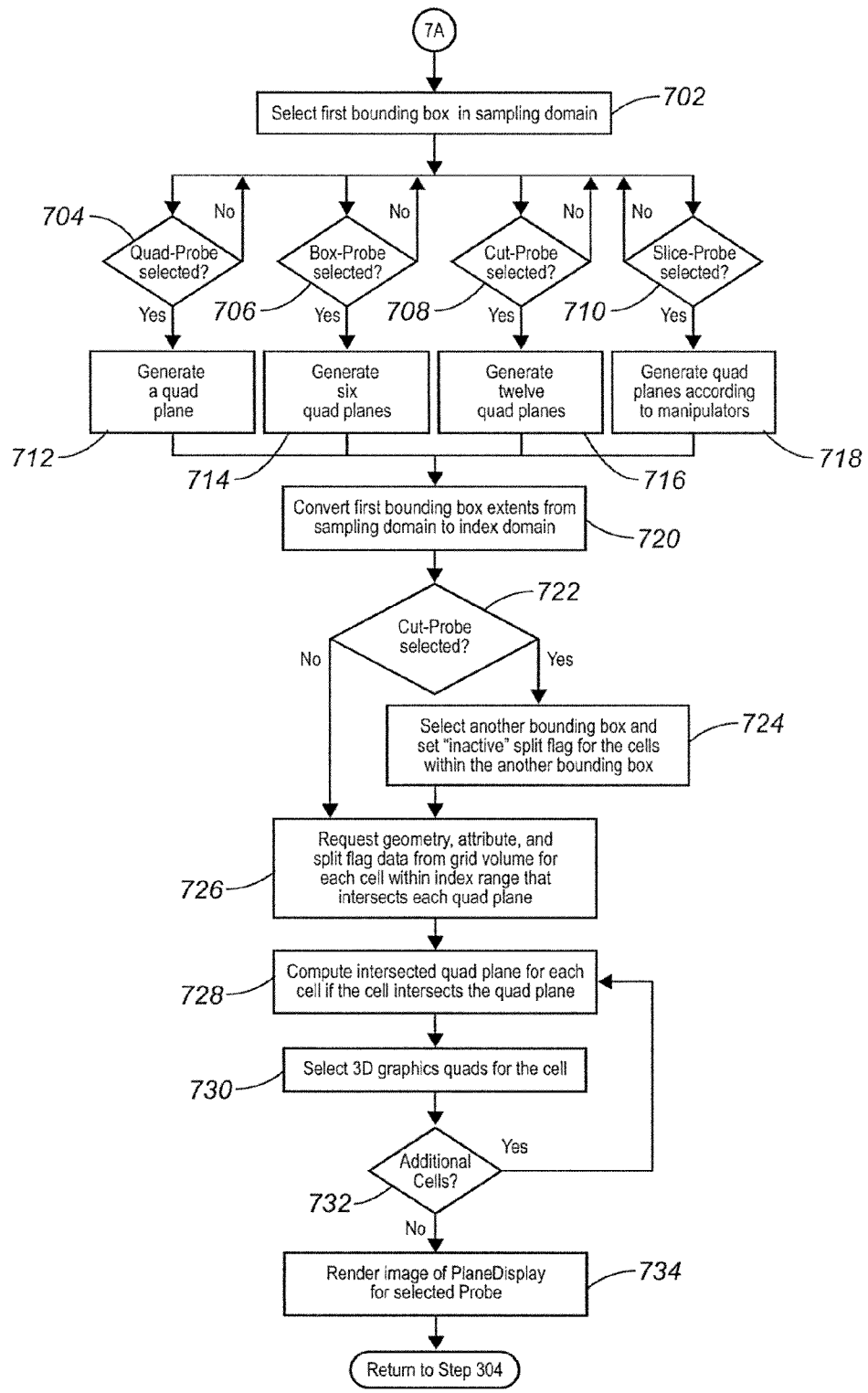
FIG. 7 is a continuation of the flow diagram illustrated in FIG. 4 for creating a probe with a PlaneDisplay.

Referring now to FIG. 7, a continuation of the flow diagram in FIG. 4 is illustrated for creating a probe with a PlaneDisplay. As demonstrated by the flow diagram in FIG. 4, the PlaneDisplay may be used in connection with a Quad-Probe, a Box-Probe, a Cut-Probe or a Slice-Probe.

In step 702, a first bounding box for the probe is selected in the sampling domain according to the type of probe selected.

In step 704, the method determines whether a Quad-Probe was selected. If a Quad-Probe was selected, then the method continues to step 712. Otherwise, the method may return to steps 706, 708 or 710.

In step 706, the method determines whether a Box-Probe was selected. If a Box-Probe was selected, then the method continues to step 714. Otherwise, the method may return to steps 704, 708 or 710.

In step 708, the method determines whether a Cut-Probe was selected. If a Cut-Probe was selected, then the method continues to step 716. Otherwise, the method may return to steps 704, 706 or 710.

In step 710, the method determines whether a Slice-Probe was selected. If a Slice-Probe was selected, then the method continues to step 718. Otherwise, the method may return to steps 704, 706 or 708.

As demonstrated herein, steps 704-712 may be processed individually, in any order, or simultaneously.

In step 712, a quad plane is generated for the Quad-Probe using the modules and techniques described in reference to FIG. 2.

In step 714, six quad planes are generated for the Box-Probe. Each quad plane may be generated using the same techniques used to generate the quad plane in step 712.

In step 716, twelve quad planes are generated for the Cut-Probe. Each quad plane may be generated using the same techniques used to generate the quad plane in step 712.

In step 718, quad planes are generated between the opposing manipulators on the Slice-Probe. Each quad plane may be generated using the same techniques used to generate the quad plane in step 712.

In step 720, the first bounding box extents are converted (mapped) from the sampling domain to the index domain using the modules and techniques described in reference to FIG. 2.

In step 722, the method determines whether a Cut-Probe was selected. If a Cut-Probe was selected, then the method continues to step 724. Otherwise, the method continues to step 726.

In step 724, another bounding box is selected for the Cut-Probe, and a split flag for each cell in the another bounding box is set to inactive status.

In step 726, the geometry, attribute and split flag data for each cell within an index range that intersects each quad plane are requested from the grid volume using the modules and techniques described in reference to FIG. 2.

In step 728, an intersected quad plane is computed for each cell if the cell intersects the quad plane. To find an intersection between the quad plane and any cell, one approach may be used that divides a cell into five (5) tetrahedrons. Then a look-up table may be applied to map the intersected edges to triangles. Using this approach, a cross-section may be moved interactively inside a 2.3 million cell grid.

In step 730 3-D graphics quads for the cell are selected for each cell that intersects a quad plane using the modules and techniques described in reference to FIG. 2.

In step 732, the method determines whether there are additional cells in the first bounding box using techniques well known in the art. If there are additional cells in the first bounding box, then the method returns to step 728. Otherwise, the method continues to step 734.

In step 734, a PlaneDisplay image for the selected probe is rendered using the modules and techniques described in reference to FIG. 2.

After step 734, the method returns to step 304 and waits for input or a request to move the probe, re-size the probe and/or create another probe.

Figure 15:
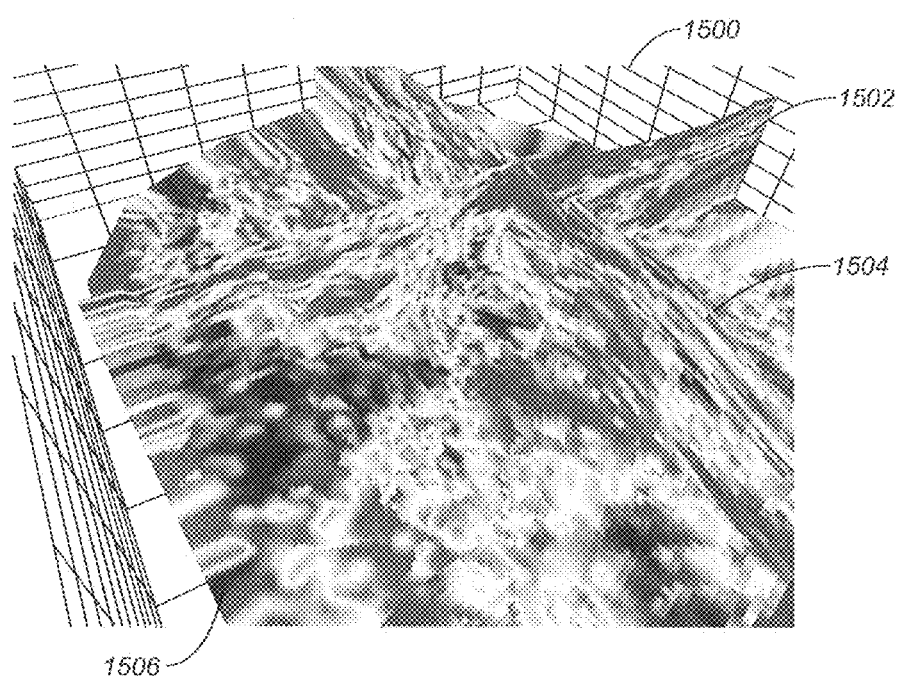
FIG. 15 is an image illustrating a Quad-Probe PlaneDisplay created according to the flow diagram illustrated in FIG. 7.

In FIG. 15, an image 1500 illustrates exemplary Quad-Probe PlaneDisplays (1502, 1504, 1506) created according to the flow diagram in FIG. 7. The PlaneDisplay is designed to build layers and sections that cut across true reservoir layers, similar to a time-slice in a geophysical cube. The PlaneDisplay is most useful for evaluating the geological and petrophysical properties at particular depths. A PlaneDisplay, for example, constructed at a flat oil/water contact point would permit the geometry and property distribution of the higher quality reservoir layers above and below the contact point to be examined. The PlaneDisplay renders an image similar to a slice that intersects a defined plane through a Box-Probe, a Quad-Probe, and a Slice-Probe.

In FIG. 18, an image 1800 illustrates an exemplary Box-Probe PlaneDisplay (1802) created according to the flow diagram in FIG. 7.

In FIG. 20, an image 2000 illustrates an exemplary Slice-Probe PlaneDisplay (2008) created according to the flow diagram in FIG. 7.

Figure 8:
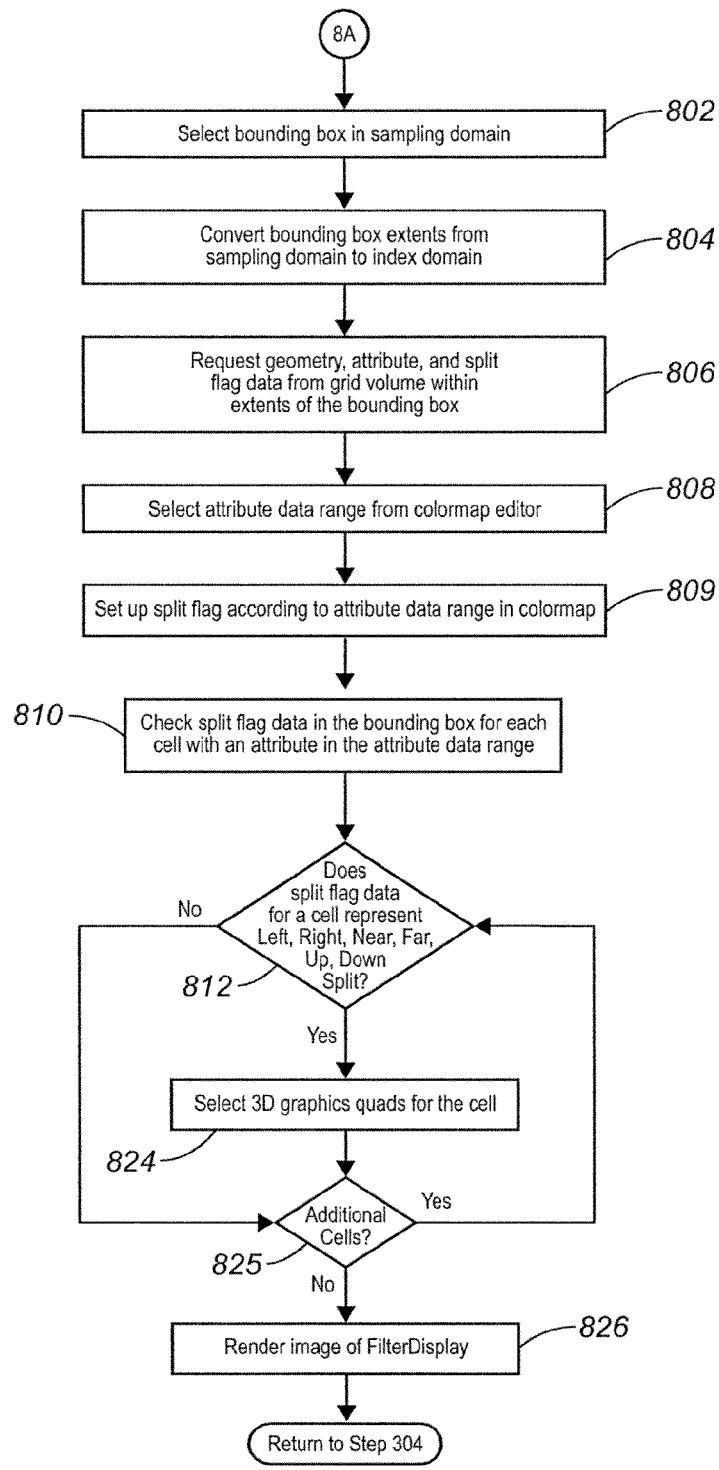
FIG. 8 is a continuation of the flow diagram illustrated in FIG. 4 for creating a probe with a cell-rendered FilterDisplay.

Referring now to FIG. 8, a continuation of the flow diagram in FIG. 4 is illustrated for creating a probe with a cell-rendered FilterDisplay. As demonstrated by the flow diagram in FIG. 4, the cell-rendered FilterDisplay may only be used in connection with a Filter-Probe.

In step 802, a bounding box for the Filter-Probe is selected in the sampling domain according to the type of probe selected.

In step 804, the bounding box extents are converted (mapped) from the sampling domain to the index domain using modules and techniques described in reference to FIG. 2.

In step 806, the geometry, attribute and split flag data for each cell within the extents of the bounding box in the index domain are requested from the grid volume using the modules and techniques described in reference to FIG. 2.

In step 808, an attribute data range is selected from a color map editor using a conventional graphical user interface.

In step 809, a split flag is set up as a filter using the selected attribute data range.

In step 810, the split flag data in the bounding box is checked for each cell with an attribute in the attribute data range using techniques well known in the art.

In step 812, the method determines if the split flag data for a cell in the bounding box with an attribute in the attribute data range represents a left, right, near, far, up or down split. If the split flag data for the cell represents a left, right, near, far, up or down split, then the method continues to step 824. Otherwise, the method continues to step 825 to determine whether there are additional cells in the bounding box.

In step 824, 3-D graphics quads for the cell are selected using the modules and techniques described in reference to FIG. 2.

In step 825, the method determines whether there are additional cells in the bounding box using techniques well known in the art. If there are additional cells in the bounding box, then the method returns to step 812. Otherwise, the method continues to step 826.

In step 826, a cell-rendered FilterDisplay image for the Filter-Probe is rendered using the modules and techniques described in reference to FIG. 2.

After step 826, the method returns to step 304 and waits for input or a request to move the probe, re-size the probe and/or create another probe.

In FIG. 21A, an image 2100 illustrates an exemplary cell-rendered Filter-Probe FilterDisplay (2104) created according to the flow diagram in FIG. 8. In the FilterDisplay, cells that are less than a defined threshold are filtered out, while the rest are displayed with different colors.

Figure 9:
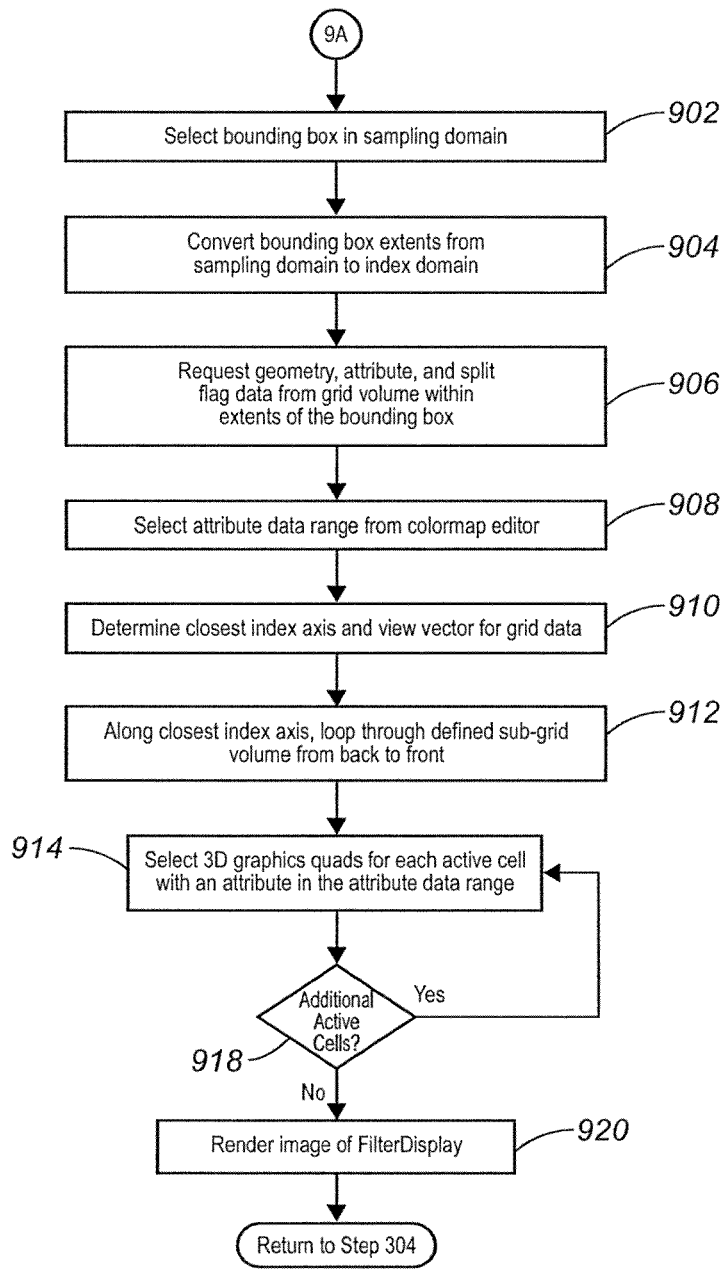
FIG. 9 is a continuation of the flow diagram illustrated in FIG. 4 for creating a probe with a volume-rendered FilterDisplay.

Referring now to FIG. 9, a continuation of the flow diagram in FIG. 4 is illustrated for creating a probe with a volume-rendered FilterDisplay. As demonstrated by the flow diagram in FIG. 4, the volume-rendered FilterDisplay may only be used in connection with a Filter-Probe.

In step 902, a bounding box for the Filter-Probe is selected in the sampling domain according to the type of probe selected.

In step 904, the bounding box extents are converted (mapped) from the sampling domain to the index domain using the modules and techniques described in reference to FIG. 2.

In step 906, the geometry, attribute and split flag data for each cell within the extents of the bounding box in the index domain are requested from the grid volume using the modules and techniques described in reference to FIG. 2.

In step 908, an attribute data range is selected from the color map editor using a conventional graphical user interface.

In step 910, a closest index axis and a view vector for the grid data from step 906 are computed using techniques well known in the art.

In step 912, the method loops through the defined sub-grid volume from back to front along the closest index axis.

In step 914, 3D graphics quads for each active cell in the bounding box with an attribute in the attribute data range are selected using the modules and techniques described in reference to FIG. 2.

In step 918, the method determines whether there are additional active cells in the bounding box using techniques well known in the art. If there are additional active cells in the bounding box, then the method returns to step 914. Otherwise, the method continues to step 920.

In step 920, a volume-rendered FilterDisplay image for the Filter-Probe is rendered using the modules and techniques described in reference to FIG. 2.

After step 920, the method returns to step 304 and waits for input or a request to move the probe, re-size the probe and/or create another probe.

In FIG. 21B, an image 2106 illustrates an exemplary volume-rendered Filter-Probe FilterDisplay (2110) created according to the flow diagram in FIG. 9. For reservoir visualization and volume rendering, a FilterDisplay may be used to roughly mimic the continuity of geological and petrophysical features and the shape of "geobodies" that result from connected cells with like properties. Using typical volume rendering for seismic data, the alpha channel of the color table was used to specify a display range for the grid data. Domain geoscientists and engineers want to see and understand the attribute magnitude at each cell. Therefore, instead of surface volume rendering, cell-based volume rendering was implemented. This method can generate closed isosurfaces. The connection threshold can be set to specify the threshold number of connected cells. If the connected cells within a body are less than the threshold, those cells are filtered (removed).

Figure 10:
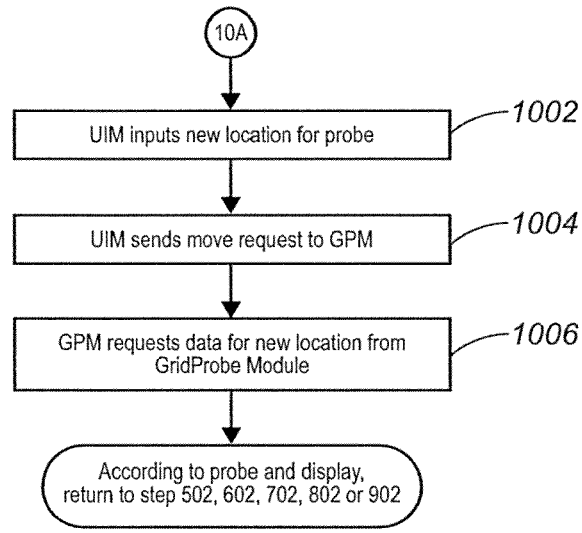
FIG. 10 is a continuation of the flow diagram illustrated FIG. 3 for moving a probe.

Referring now to FIG. 10, a continuation of the flow diagram in FIG. 3 is illustrated for moving a probe. Once a particular probe and display are created according to one of the flow diagrams illustrated in FIGS. 5-9, each probe may be moved in the following manner.

In step 1002, the new location for the probe is input by UIM 222. In a preferred embodiment, any conventional input device may be used to direct the new location of the probe. The location of the probe may be moved by contacting a manipulator on the display with the input device and selecting (through a graphical user interface or the input device) to move the probe in any direction by dragging the manipulator or display along a trajectory to a new location. When a new location for the probe is reached, the input device is used to release the manipulator or display.

In step 1004, UIM 222 sends a move request to GPM 220 to draw (render) the probe at the new location.

In step 1006, GPM 220 requests grid data for the new location of the probe from GridProbe Module 226. GPM 220 processes the grid data extracted by VSM 230 for the probe being moved, and draws (renders) the probe at a new location in accordance with the attributes selected.

As the probe is moved, for each new location of the probe, the steps described herein and in FIG. 5, 6, 7, 8 or 9 may be repeated at a rate sufficiently fast that the image of the probe may be perceived as changing with movement of the probe. In other words, the image of the probe is being redrawn at a frame rate sufficiently fast to be perceived in real-time. To meet the goal of real-time performance, only the outside layers of the probe may be displayed while the probe is moving. The points (vertex for a cell) may be drawn as cells for a large probe, and the 3D graphics quads may be drawn as split faces for a small probe. When the probe stops moving, the full shading details are displayed. For cases where grid data is requested from disc memory and is extremely slow, the outlines of the bounding box may be drawn while moving the probe.

Figure 22:
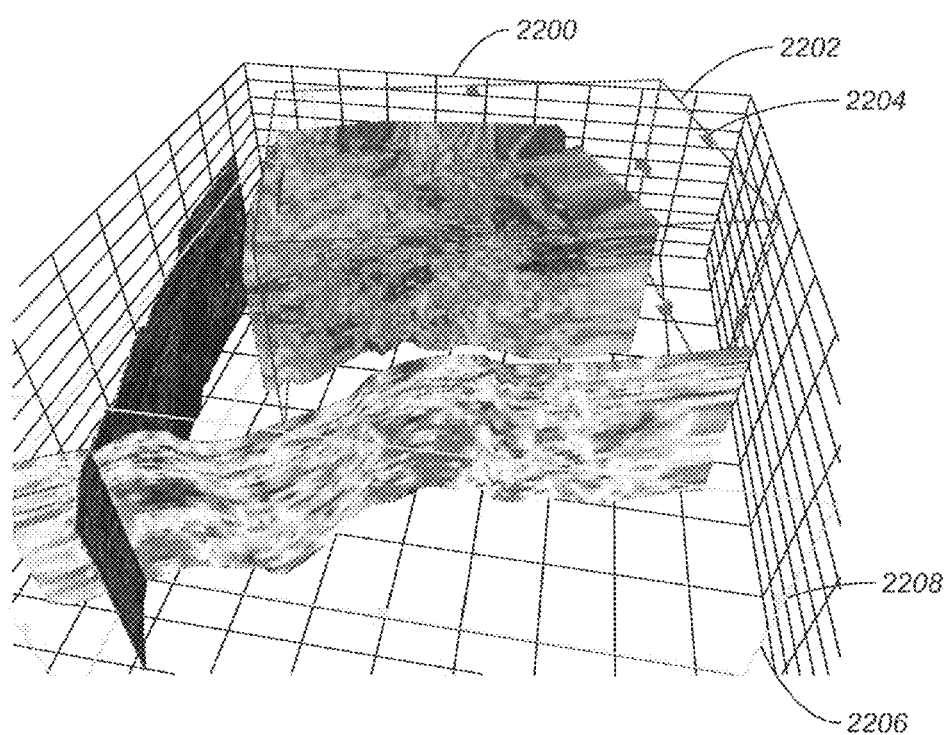
FIG. 22 is an image illustrating manipulators for a Quad-Probe and a Box-Probe.

Referring now to FIG. 22, an image 2200 illustrates manipulators for a Quad-Probe and a Box-Probe. The yellow manipulators 2208 are connected by yellow lines forming the Quad-Probe bounding box 2206. The red manipulators 2204 are connected by red lines forming the Box-Probe bounding box 2202. Multiple Quad-Probes may be created, producing an effect similar to a fence diagram (a series of intersecting cross sections and maps) as illustrated in FIG. 22.

Referring now to FIG. 20, an image 2000 illustrates manipulators for a Cut-Probe, a Slice-Probe and a Filter-Probe. The purple manipulators are connected by purple lines forming the Cut-Probe inner-bounding box 2006. The yellow manipulators are connected by yellow lines forming the Cut-Probe outer-bounding box 2004. The red manipulators are connected by red lines forming the Slice-Probe bounding box 2010. The green manipulators, positioned on opposite faces of the Slice-Probe bounding box 2010, form multiple quad planes 2012 representing bounding boxes between the opposing manipulators. The blue manipulators are connected by blue lines forming the Filter-Probe bounding box 2016.

Figure 11:
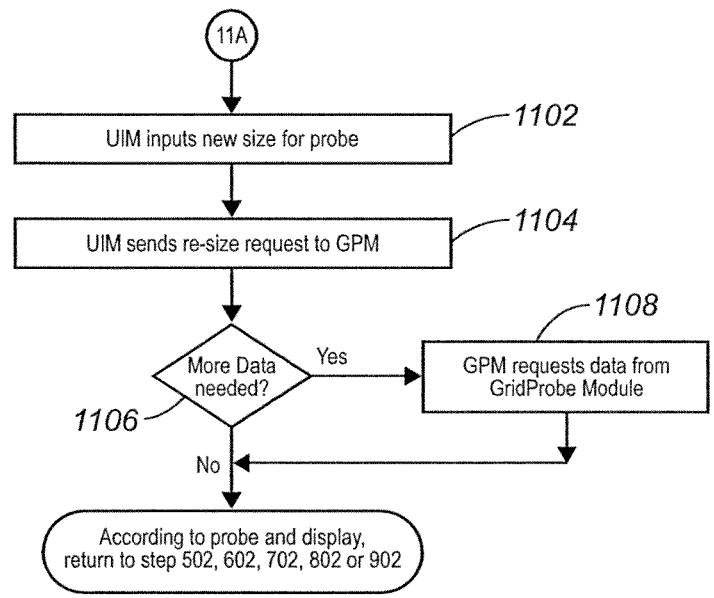
FIG. 11 is a continuation of the flow diagram illustrated in FIG. 3 for resizing a probe.

Referring now to FIG. 11, a continuation of the flow diagram in FIG. 3 is illustrated for re-sizing a probe. Once a particular probe and display are created according to one of the flow diagrams illustrated in FIGS. 5-9, each probe may be re-sized in the following manner.

In step 1102, the new size for the probe is input by UIM 222. In a preferred embodiment, any conventional input device may be used to re-size the probe. The size of the probe may be altered, which may also alter the shape of the probe, by contacting a manipulator or the display with the input device and selecting (through a graphical user interface or the input device) to re-size the probe by dragging the manipulator or the display in any direction. When the input device contacts a manipulator or a display, movement of the input device may be used to change the dimensions or properties of the surface on which the manipulator is located. When a desired size or shape for the probe is reached, the input device is used to release the manipulator or display. The location of the manipulators is not limited to the bounding box geometry for the probe. It is to be understood, however, that the present invention is not limited to the use of manipulators for resizing probes, and other suitable, well known, implementations may be used such as, for example, the "sizing tabs" described in U.S. Pat. No. 6,765,570.

In step 1104, UIM 222 sends a re-size request to GPM 220 to draw (render) the re-sized probe.

In step 1106, the method determines whether more data is needed to draw the re-sized probe. For example, if the re-sized probe is of a shape and size that fits inside the existing probe, then no more data is needed, and processing continues according to the probe and display selected when the method returns to step 502, 602, 702, 802 or 902. Otherwise, if the re-sized probe is of a shape and size that falls at least partially outside of the existing probe, then the method continues to step 1108.

In step 1108, GPM 220 requests grid data needed for the re-sized probe from GridProbe Module 226. GPM 220 processes the grid data extracted by VSM 230 for the probe being re-sized, and draws (renders) the probe with its new size and/or shape in accordance with the attributes selected.

As the size and/or shape of the probe changes, the steps described herein and in FIG. 5, 6, 7, 8 or 9 may be repeated at a rate sufficiently fast that the image of the probe may be perceived as changing with the changing size and/or shape of the probe. The image of the probe is therefore, being redrawn at a frame rate sufficiently fast to be perceived in real-time.

Figure 23:
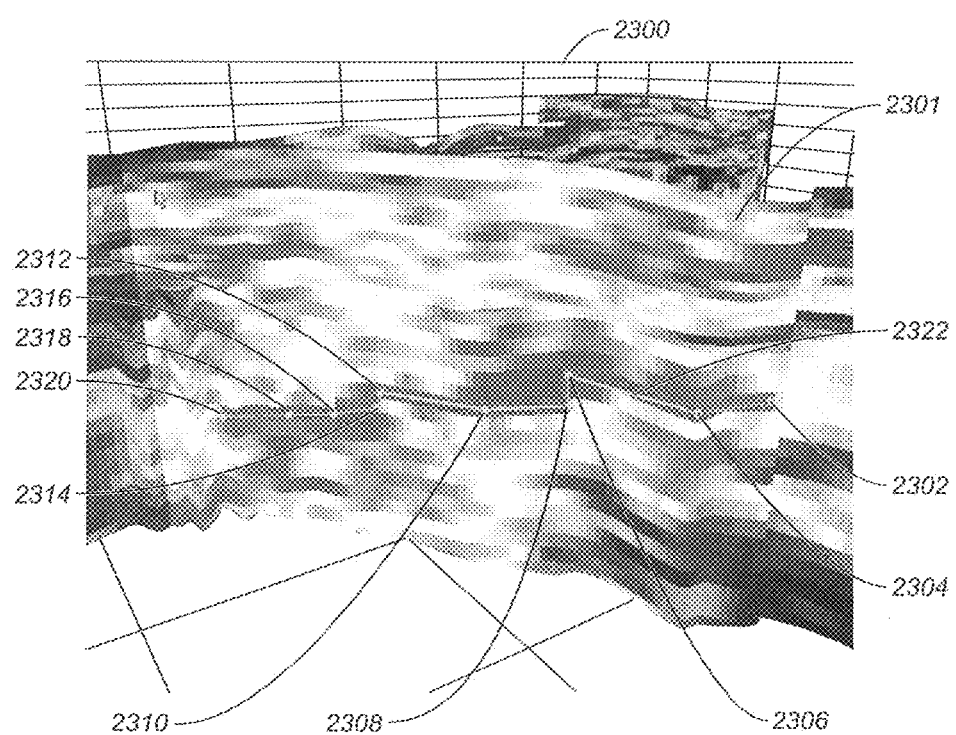
FIG. 23 is an image illustrating the use of control points on a probe to locate intersecting cells.

Referring now to FIG. 23, an image 2300 illustrates the use of control points (2302, 2304, 2306, 2308, 2310, 2312, 2314, 2316, 2318, 2320) to locate cells in a Quad-Probe ShellDisplay 2301 that intersect line segments (e.g. 2322) between the control points. For editing operations, this particular application may include functionality to enter, move, and delete control points on any type of probe display. Certain graphics objects, such as a point, a line, a plane, or polygons, may therefore, be displayed to assist the application for a particular process. Then, the application can query these cells to apply the particular process.

Example

The present invention was applied to two large grids (a first grid of 2.3 million cells (190×300×40) and a second grid of 20 million cells (300×400×168)) on a 32 bit Windows® operating system. The computer system comprised a bi-Xeon 3.6 GHz with 3 GB of RAM and an NVIDIA Quadro FX 5600 graphics card. Table 1 summarizes the results of the application using a Box-Probe ShellDisplay and a Quad-Probe ShellDisplay.

TABLE 1

| | Data Size | | | | | | | |
| --- | --- | --- | --- | --- | --- | --- | --- | --- |
| | 2.3 million cells | | | | 20 million cells | | | |
| | Probe Type and Direction | | | | | | | |
| | Box-Probe | Quad-Probe (I) | Quad-Probe (J) | Quad-Probe (K) | Box-Probe | Quad-Probe (I) | Quad-Probe (J) | Quad-Probe (K) |
| Probe Size (millions) | 2.3 | .012 | .008 | .057 | 20.2 | .067 | .05 | .12 |
| Full Render frames/sec. | 2.5 | 21 | 167 | 63 | 0.07 | 5.8 | 13 | 4 |
| Dragging frames/sec. | 13 | 21 | 167 | 63 | >200 | 5.8 | 13 | 4 |

The 3D interaction techniques and most of the visualization techniques described herein may be applied to structured and unstructured grid volumes, As demonstrated by the dragging speed (>200) for the Box-Probe, the display of only the bounding box significantly increased the rendering speed.

While the present invention has been described in connection with presently preferred embodiments, it will be understood by those skilled in the art that it is not intended to limit the invention to those embodiments. The present invention may also be applied to other types of geometrically irregular data such as, for example, medical data and engineering data. It is therefore, contemplated that various alternative embodiments and modifications may be made to the disclosed embodiments without departing from the spirit and scope of the invention defined by the appended claims and equivalents thereof.

The invention claimed is:

1. A method for imaging a three-dimensional volume of geometrically irregular grid data representing a grid volume, comprising:
    selecting a grid probe within the grid volume, the grid probe defined by a bounding box in a sampling domain, the grid volume comprising multiple cells and the grid data comprising a normal vector and a geometry for each face of each cell, split flag data for each cell, an attribute for each cell and an attribute data value for each cell wherein the split flag data comprises data representing each face of a respective cell and its position relative to a face of another cell;
    mapping extents of the bounding box from the sampling domain to an index domain;
    rendering an image of the grid probe within the grid volume using a computer processor, the image comprising the grid data only within at least a portion of the extents of the bounding box; and
    repeating the rendering step in response to movement of the grid probe within the grid volume so that as the grid probe moves, the image of the grid probe is redrawn at a rate sufficiently fast to be perceived as moving in real-time.

2. The method of claim 1, wherein the vertices for each cell are represented by grid coordinates or world coordinates.

3. The method of claim 1, wherein the attribute, and the attribute data value, the geometry and the normal vector are defined as 3D graphics quads for each cell.

4. The method of claim 1, wherein the bounding box is two-dimensional or three-dimensional.

5. The method of claim 1, wherein the grid probe represents a Quad-Probe, a Box-Probe, a Cut-Probe, a Slice-Probe or a Filter-Probe.

6. The method of claim 1, wherein the image of the grid probe is redrawn at a rate of at least ten frames per second.

7. The method of claim 1, further comprising:
    mapping the grid data within the extents of the bounding box from the sampling domain to the index domain; and
    repeating the mapping and rendering steps in response to movement of the grid probe within the grid volume so that as the grid probe moves, the image of the grid probe is redrawn at a rate sufficiently fast to be perceived as moving in real-time.

8. A non-transitory program carrier device tangibly carrying computer executable instructions method for imaging a three-dimensional volume of geometrically irregular grid data representing a grid volume, the instructions being executable to implement:
    selecting a grid probe within the grid volume, the grid probe defined by a bounding box in a sampling domain, the grid volume comprising multiple cells and the grid data comprising a normal vector and a geometry for each face of each cell, split flag data for each cell, an attribute for each cell and an attribute data value for each cell wherein the split flag data comprises data representing each face of a respective cell and its position relative to a face of another cell;
    mapping extents of the bounding box from the sampling domain to an index domain;
    rendering an image of the grid probe within the grid volume, the image comprising the grid data only within at least a portion of the extents of the bounding box; and
    repeating the rendering step in response to movement of the grid probe within the grid volume so that as the grid probe moves, the image of the grid probe is redrawn at a rate sufficiently fast to be perceived as moving in real-time.

9. The program carrier device of claim 8, wherein the vertices for each cell are represented by grid coordinates or world coordinates.

10. The program carrier device of claim 8, wherein the attribute, and the attribute data value, the geometry and the normal vector are defined as 3D graphics quads for each cell.

11. The program carrier device of claim 8, wherein the bounding box is two-dimensional or three-dimensional.

12. The program carrier device of claim 8, wherein the grid probe represents a Quad-Probe, a Box-Probe, a Cut-Probe, a Slice-Probe or a Filter-Probe.

13. The program carrier device of claim 8, wherein the image of the grid probe is redrawn at a rate of at least ten frames per second.

14. The program carrier device of claim 8, further comprising:

mapping the grid data within the extents of the bounding box from the sampling domain to the index domain; and repeating the mapping and rendering steps in response to movement of the grid probe within the grid volume so that as the grid probe moves, the image of the grid probe is redrawn at a rate sufficiently fast to be perceived as moving in real-time.

\* \* \* \* \*